United States Patent
Jeong et al.

(10) Patent No.: US 11,544,056 B2
(45) Date of Patent: Jan. 3, 2023

(54) ELECTRONIC DEVICE AND OPERATING METHOD THEREOF

(71) Applicant: SAMSUNG ELECTRONICS CO., LTD., Suwon-si (KR)

(72) Inventors: Jin-Hong Jeong, Yongin-si (KR); Chan-Woo Park, Seongnam-si (KR); In-Sick Jung, Suwon-si (KR); Min-Ho Kang, Suwon-si (KR); Jun-Hak Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 545 days.

(21) Appl. No.: 16/489,808

(22) PCT Filed: Mar. 21, 2018

(86) PCT No.: PCT/KR2018/003279
§ 371 (c)(1),
(2) Date: Aug. 29, 2019

(87) PCT Pub. No.: WO2018/182227
PCT Pub. Date: Oct. 4, 2018

(65) Prior Publication Data
US 2019/0384596 A1 Dec. 19, 2019

(30) Foreign Application Priority Data
Mar. 28, 2017 (KR) .......... 10-2017-0039571

(51) Int. Cl.
*G06F 9/24* (2006.01)
*H04W 4/80* (2018.01)
(Continued)

(52) U.S. Cl.
CPC .............. *G06F 9/24* (2013.01); *G06F 9/4401* (2013.01); *H04L 65/40* (2013.01); *H04W 4/80* (2018.02);
(Continued)

(58) Field of Classification Search
CPC ........ G06F 9/4401; G06F 9/24; G06F 3/0683; G06F 9/4408; G06F 30/30;
(Continued)

(56) References Cited

U.S. PATENT DOCUMENTS 8,874,097 B1 * 10/2014 Warsaw ............... H04W 88/06
455/418
9,159,013 B2 * 10/2015 Zhao ..................... G06F 9/4401
(Continued)

FOREIGN PATENT DOCUMENTS

KR   10-2012-0052572   5/2012
KR   10-2016-0030508   3/2016
(Continued)

OTHER PUBLICATIONS

International Search Report for PCT/KR2018/003279, dated Jun. 22, 2018, 5 pages.
(Continued)

*Primary Examiner* — Tuan H Nguyen
(74) *Attorney, Agent, or Firm* — Nixon & Vanderhye, P.C.

(57) ABSTRACT

An electronic device according to various embodiments of the present invention comprises: a communication circuit; at least one processor electrically connected to the communication circuit; and a memory electrically connected to the processor, wherein the memory can store instructions causing, when executed, the processor to: receive, through the communication circuit, first information indicating the state of the first electronic device from a first electronic device (Continued)

after initiating booting of the first electronic device and before completion of the booting; and control an output device functionally connected to the processor such that state information of the first electronic device is outputted on the basis of the first information. Additionally, other embodiments are possible.

6 Claims, 14 Drawing Sheets

(51) Int. Cl.
    *G06F 9/4401*     (2018.01)
    *H04W 48/12*     (2009.01)
    *H04W 88/06*     (2009.01)
    *H04W 12/50*     (2021.01)
    *H04L 65/40*     (2022.01)

(52) U.S. Cl.
    CPC ............ *H04W 12/50* (2021.01); *H04W 48/12* (2013.01); *H04W 88/06* (2013.01)

(58) Field of Classification Search
    CPC .... G06F 2115/10; G06F 21/575; H04L 29/08; H04L 41/0806; H04W 4/80; H04W 88/06; H04W 48/12; H04W 12/50; H04W 12/003

See application file for complete search history.

(56) References Cited

U.S. PATENT DOCUMENTS

| | | |
|---|---|---|
| 9,509,676 B1 | 11/2016 | Johnson et al. |
| 2012/0086857 A1 | 4/2012 | Kim et al. |
| 2013/0109323 A1 | 5/2013 | Ruutu et al. |
| 2013/0178160 A1* | 7/2013 | Wang .................... H04W 48/10 455/41.2 |
| 2017/0039845 A1 | 2/2017 | Lim et al. |
| 2018/0263071 A1 | 9/2018 | Yoon et al. |

FOREIGN PATENT DOCUMENTS

| | | |
|---|---|---|
| KR | 10-2017-0017590 | 2/2017 |
| KR | 10-2018-0102823 | 9/2018 |
| KR | 10-2018-0110896 | 10/2018 |

OTHER PUBLICATIONS

Written Opinion of the ISA for PCT/KR2018/003279, dated Jun. 22, 2018, 6 pages.

* cited by examiner

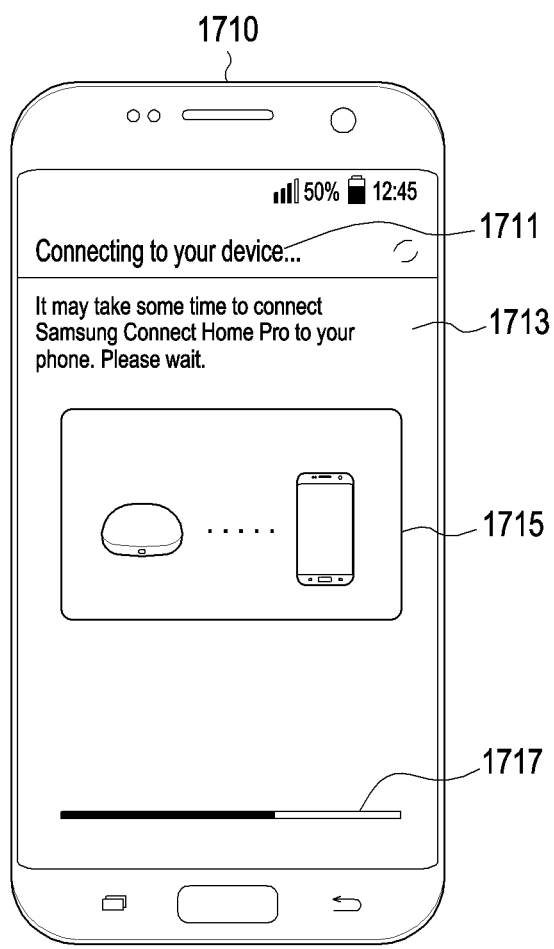

US 11,544,056 B2

ELECTRONIC DEVICE AND OPERATING METHOD THEREOF

This application is the U.S. national phase of International Application No. PCT/KR2018/003279 filed 21 Mar. 2018, which designated the U.S. and claims priority to KR Patent Application No. 10-2017-0039571 filed 28 Mar. 2017, the entire contents of each of which are hereby incorporated by reference.

TECHNICAL FIELD

Various embodiments of the disclosure relate to an electronic device that operates in communication with another electronic device and an operating method thereof.

BACKGROUND ART

With the advent of the Internet of Things (IoT), a user is provided with services implemented by various IoT devices. For example, the user can receive home system services through a mobile electronic device (e.g., a smartphone having an application connected to an IoT device) that is connected to various IoT devices (e.g., a refrigerator, a water purifier, a kimchi refrigerator, a washing machine, a boiler, a robot cleaner, a gas range, a plurality of sensors {a light, a ventilator, etc.}, and the like). Through a smartphone that the user carries, the user can control the temperature of a boiler connected to the home system service or turn off the lamp of a living room connected thereto.

An application for controlling the IoT device may be a dedicated application capable of controlling one IoT device or an integrated application capable of controlling a plurality of various IoT devices.

DETAILED DESCRIPTION OF THE INVENTION

Technical Problem

For example, an integrated application capable of controlling a plurality of IoT devices may provide a consistent experience for a user, but the user experience provided by a dedicated application for each IoT device may be worse than the dedicated application. When a user uses the dedicated application, the dedicated application knows what the corresponding IoT device is, but when a user uses the integrated application, the integrated application does not know what type of IoT device the user wants to connect to until the IoT device is completely booted and then transmits a signal containing identification information. For example, if a Wi-Fi router is installed, a user can receive information about all the processes from out of box to the completion of Wi-Fi router installation such as power connection through a dedicated application for the Wi-Fi router, booting, searching, pairing, registration, and the like through a description using text, images, and the like. However, if the Wi-Fi router is installed through an integrated application, the integrated application can provide the user with a description of the installation of the Wi-Fi router from the point of time at which the searched Wi-Fi router is added to the integrated application after the completion of the booting of the Wi-Fi router. In the case of an IoT device having a long booting time, it is inconvenient that the user cannot know whether the booting of the IoT device is normally proceeding.

An electronic device according to various embodiments of the disclosure may receive information about the booting state of a first electronic device (e.g., an IoT device) that the electronic device wants to connect to during booting of the first electronic device and may provide the received information to a user. The user may be provided with information about whether the booting of the first electronic device is normally performed even during the booting of the first electronic device to be connected to the electronic device, the booting process for the first electronic device, specifically, information about the normal and abnormal booting processes, and the like.

An electronic device according to various embodiments of the disclosure may transmit information about the booting state of the electronic device to another electronic device (e.g., in the case in which the electronic device is an IOT device, the other electronic device corresponds to an electronic device that wants to connect to the IOT device) through a communication circuit that has already been booted before the booting of the electronic device is completed. Using the communication circuit that has already been booted, information about the electronic device that is being currently booted, information about another communication circuit, included in the electronic device, which is still booted, and the like may be provided to the other electronic device that wants to connect to the electronic device, as booting state information of the electronic device.

Technical Solution

In accordance with an aspect of the disclosure, an electronic device according to various embodiments of the disclosure may include: a communication circuit; at least one processor electrically connected to the communication circuit; and a memory electrically connected to the processor. The memory may store, when executed, instructions that cause the processor to receive, from a first electronic device, first information indicating a state of the first electronic device through the communication circuit after a booting of the first electronic device is initiated and before the booting thereof is completed, and to control an output device functionally connected to the processor to output state information of the first electronic device on the basis of the first information.

An electronic device according to various embodiments of the disclosure may include: a communication circuit; at least one processor electrically connected to the communication circuit; and a memory electrically connected to the processor. The memory may store, when executed, instructions that cause the processor to transmit first information about the state of the electronic device through the communication circuit after a booting of the electronic device is initiated and before the booting of the electronic device is completed.

A computer-readable recording medium that stores instructions configured to perform at least one operation by a processor according to various embodiments of the disclosure may include an operation of receiving first information about the state of a first electronic device after a booting of the first electronic device is initiated and before the booting of the first electronic device is completed; and an operation of controlling an output device to output state information of the first electronic device on the basis of the first information.

Advantageous Effects

An electronic device according to various embodiments of the disclosure may receive booting state information about a first electronic device during the booting of the first electronic device that wants to connect to the electronic device, and may output a state in which the first electronic device is booted. A blackout time for a user can be reduced as part of the booting time during the booting time of the first electronic device.

An electronic device according to various embodiments of the disclosure may transmit information about the booting state of the electronic device to another electronic device that wants to connect to the electronic device using a communication circuit that has already been booted, during the booting of the electronic device, thereby quickly providing information about the electronic device to a user using the other electronic device. In the case of an electronic device having a long booting time, the inconvenience of a user who wants to add the corresponding electronic device through the other electronic device can be solved.

BRIEF DESCRIPTION OF DRAWINGS

FIG. 17A is a conceptual diagram illustrating a method of displaying installation information of a first electronic device in an electronic device including a plurality of communication circuits according to various embodiments of the disclosure;

FIG. 17B is a conceptual diagram illustrating a method of displaying installation information of a first electronic device in an electronic device including a plurality of communication circuits according to various embodiments of the disclosure.

MODE FOR CARRYING OUT THE INVENTION

Figure 1:
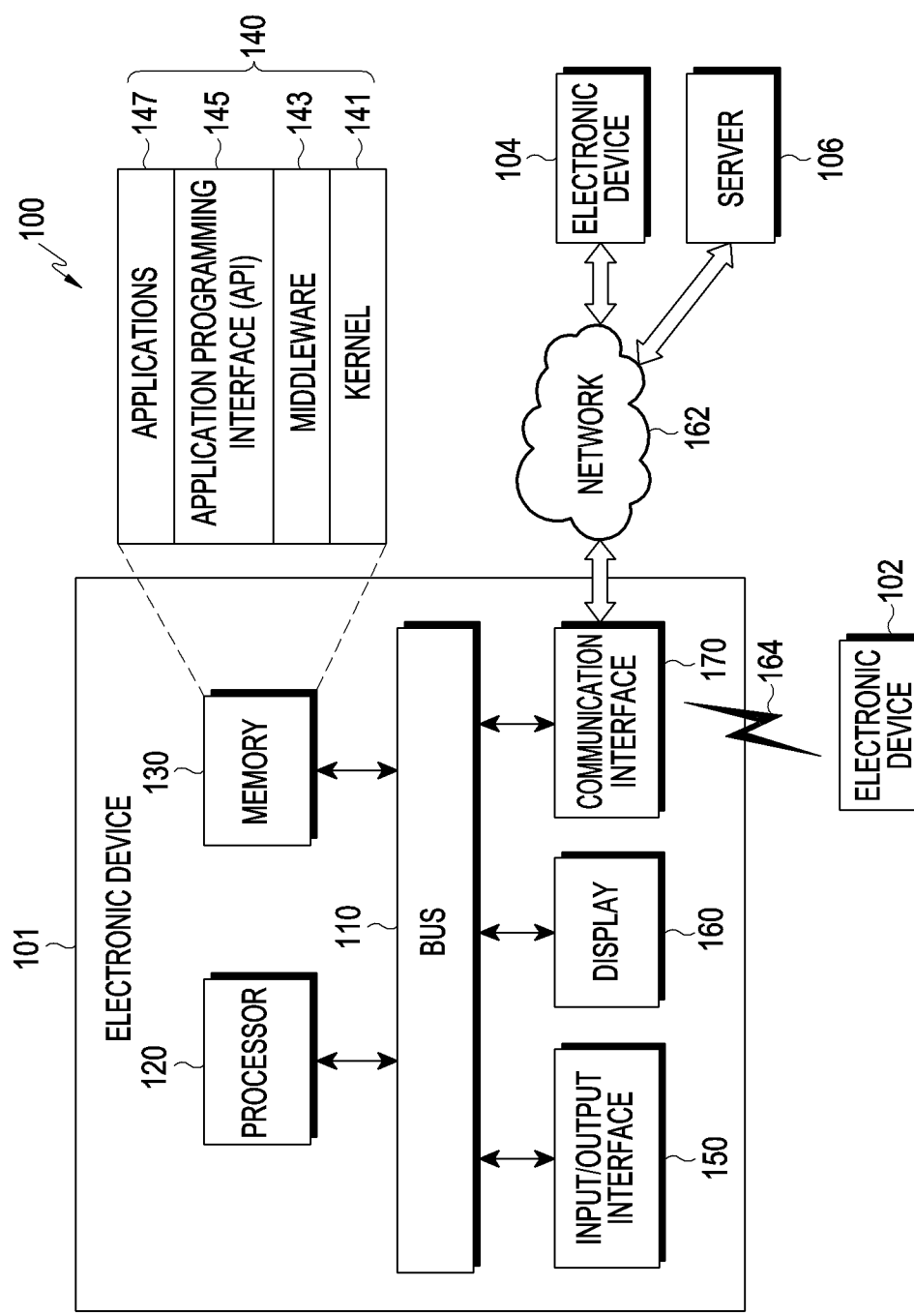
FIG. 1 is a block diagram illustrating an electronic device and a network according to various embodiments of the disclosure.

Hereinafter, various embodiments of the disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. As used herein, the expression "A or B" or "at least one of A and/or B" may include all possible combinations of items enumerated together. The expression "a first", "a second", "the first", or "the second" may modify various components regardless of the order and/or the importance, and is used merely to distinguish one element from any other element without limiting the corresponding elements. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

An electronic device according to various embodiments of the disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), an MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a pair of glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a Digital Video Disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Device, an electronic device for a ship (e.g., a navigation device for a ship and a gyrocompass), avionics, security devices, an automotive head unit, a robot for home or industry, an Automatic Teller's Machine (ATM) in banks, Point Of Sales (POS) in a shop, or an internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. According to an embodiment of the disclosure, the electronic devices are not limited to those described above. In the disclosure, the term "user" may indicate a person using an electronic device or a device (e.g., an artificial intelligence electronic device) using an electronic device.

Referring to FIG. 1, an electronic device 101 within a network environment 100 according to various embodiments will be described. The electronic device 101 may include a bus 110, a processor 120, a memory 130, an input/output interface 150, a display 160, and a communication interface 170. In some embodiments, the electronic device 101 may omit at least one of the elements, or may further include other elements. The bus 110 may include, for example, a circuit that interconnects the elements 110 to 170 and transmits communication (for example, control messages or data) between the elements. The processor 120 may include one or more of a central processing unit, an application processor, and a communication processor (CP). The processor 120, for example, may carry out operations or data processing relating to the control and/or communication of at least one other element of the electronic device 101.

The memory 130 may include volatile and/or non-volatile memory. The memory 130 may store, for example, instructions or data relevant to at least one other element of the electronic device 101. According to an embodiment, the memory 130 may store software and/or a program 140. The program 140 may include, for example, a kernel 141, a middleware 143, an application programming interface (API) 145, and/or an application program (or "application") 147. At least some of the kernel 141, the middleware 143, and the API 145 may be referred to as an operating system. The kernel 141 may control or manage system resources (for example, the bus 110, the processor 120, or the memory 130) used for executing an operation or function implemented by other programs (for example, the middleware 143, the API 145, or the application 147). Furthermore, the kernel 141 may provide an interface through which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data. Furthermore, the middleware 143 may process one or more task requests, which are received from the application programs 147, according to priorities thereof. For example, the middleware 143 may assign priorities for using the system resources (for example, the bus 110, the processor 120, the memory 130, or the like) of the electronic device 101 to one or more of the application programs 147, and may process the one or more task requests. The API 145 is an interface through which the applications 147 control functions provided from the kernel 141 or the middleware 143, and may include, for example, at least one interface or function (for example, instruction) for file control, window control, image processing, or text control. For example, the input/output interface 150 may forward instructions or data, input from a user or an external device, to the other element(s) of the electronic device 101, or may output instructions or data, received from the other element(s) of the electronic device 101, to the user or the external device.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 160 may display, for example, various types of content (for example, text, images, videos, icons, and/or symbols) for a user. The display 160 may include a touch screen and may receive, for example, a touch, gesture, proximity, or hovering input using an electronic pen or the user's body part. The communication interface 170 may establish, for example, communication between the electronic device 101 and an external device (for example, a first external electronic device 102, a second external electronic device 104, or a server 106). For example, the communication interface 170 may be connected to a network 162 through wireless or wired communication to communicate with the external device (for example, the second external electronic device 104 or the server 106).

The wireless communication may include, for example, a cellular communication that uses at least one of LTE, LTE-Advance (LTE-A), code division multiple access (CDMA), wideband CDMA (WCDMA), universal mobile telecommunications system (UMTS), wireless broadband (WiBro), global system for mobile communications (GSM), or the like. According to an embodiment, the wireless communication may include, for example, at least one of Wi-Fi (Wireless Fidelity), Bluetooth, Bluetooth low energy (BLE), ZigBee, near field communication (NFC), magnetic secure transmission, Radio Frequency (RF), and body area network (BAN). According to an embodiment, the wired communication may include GNSS. The GNSS may be, for example, a global positioning system (GPS), a global navigation satellite system (Glonass), a Beidou navigation satellite system (hereinafter, referred to as "Beidou"), or Galileo (the European global satellite-based navigation system). Hereinafter, in this document, the term "GPS" may be interchangeable with the term "GNSS". The wired communication may include, for example, at least one of a Universal Serial Bus (USB), a High Definition Multimedia Interface (HDMI), Recommended Standard 232 (RS-232), power line communication, a Plain Old Telephone Service (POTS), and the like. The network 162 may include a telecommunications network, for example, at least one of a computer network (for example, a LAN or a WAN), the Internet, and a telephone network.

Each of the first and second external electronic devices 102 and 104 may be of the same or a different type from the electronic device 101. According to various embodiments, all or some of the operations executed in the electronic device 101 may be executed in another electronic device or a plurality of electronic devices (for example, the electronic devices 102 and 104 or the server 106). According to an embodiment, when the electronic device 101 has to perform some functions or services automatically or in response to a request, the electronic device 101 may make a request for performing at least some functions relating thereto to another device (for example, the electronic device 102 or 104 or the server 106) instead of performing the functions or services by itself or in addition. Another electronic device (for example, the electronic device 102 or 104, or the server 106) may execute the requested functions or the additional functions, and may deliver a result thereof to the electronic device 101. The electronic device 101 may provide the received result as it is, or may additionally process the received result to provide the requested functions or services. To this end, for example, cloud computing, distributed computing, or client-server computing technology may be used.

In various embodiments of the disclosure, the electronic device 101 may include a communication circuit (e.g., a communication circuit connected through the communication interface 170); at least one processor 120 configured to be electrically connected to the communication circuit; and a memory 130 configured to be electrically connected to the processor 120. The memory 130 may store, when executed, instructions that cause the processor 120 to receive, from the first electronic device 102, completed first information indicating the state of a first electronic device 102 through the communication circuit after the booting of the first electronic device 102 is started and before the booting thereof is, and to control an output device (e.g., an output device connected through a display 160 or an input/output interface 150) functionally connected to the processor to output state information of the first electronic device 102 on the basis of the first information.

In various embodiments of the disclosure, the first electronic device 102 may be an Internet of things (IoT) device, and the electronic device 101 may be an electronic device in which an application for connecting to an IoT device is installed. For example, the electronic device 101 may be implemented as a smartphone in which an application capable of controlling an IoT device is installed.

In various embodiments of the disclosure, the processor 120 may store the first information in the memory 130 so that the first information can indicate at least one of a state in which the first electronic device 102 is being currently booted, a state in which the booting of the first communication circuit included in the first electronic device is completed, and a state in which the second communication circuit included in the first electronic device 102 is being currently booted.

In various embodiments of the disclosure, the first communication circuit of the first electronic device 102 may be a Bluetooth low energy (BLE) communication circuit and the second communication module of the first electronic device 102 may be a Wi-Fi communication circuit.

In various embodiments of the disclosure, the first information may be included in an advertising packet according to the BLE communication of the first electronic device 102.

In various embodiments of the disclosure, the first information may be configured to be transmitted in response to loading of the BLE communication driver during the booting of the first electronic device 102.

In various embodiments of the disclosure, the communication circuit may include a BLE communication circuit and a Wi-Fi communication circuit, and the first information may be received through the BLE communication circuit.

In various embodiments of the disclosure, the output device may include at least one of an audio (not shown), a motor (not shown), and the display 160.

In various embodiments of the disclosure, the state information of the first electronic device 102 may include at least one of information about a normal booting state designated for the first electronic device 102, information about an abnormal booting state, information about a booting process, and additional information required for the booting.

In various embodiments of the disclosure, the memory 130 may further store, when executed, instructions that cause the processor 120 to receive second information about the state of the first electronic device through the communication circuit when the booting of the second communication circuit included in the first electronic device is completed or when the booting of the first electronic device is completed, and to control the output device (e.g., the display 160) to output information about the installation progress of the first electronic device 102 on the basis of the second information.

In various embodiments of the disclosure, the processor 120 may transmit a signal for controlling a sensor connected to the first electronic device 102 to the first electronic device 102 through the Wi-Fi communication circuit included in the communication circuit 170, or may receive sensing information generated by the sensor connected to the first electronic device 102 from the first electronic device 102 through the Wi-Fi communication circuit.

Figure 2:
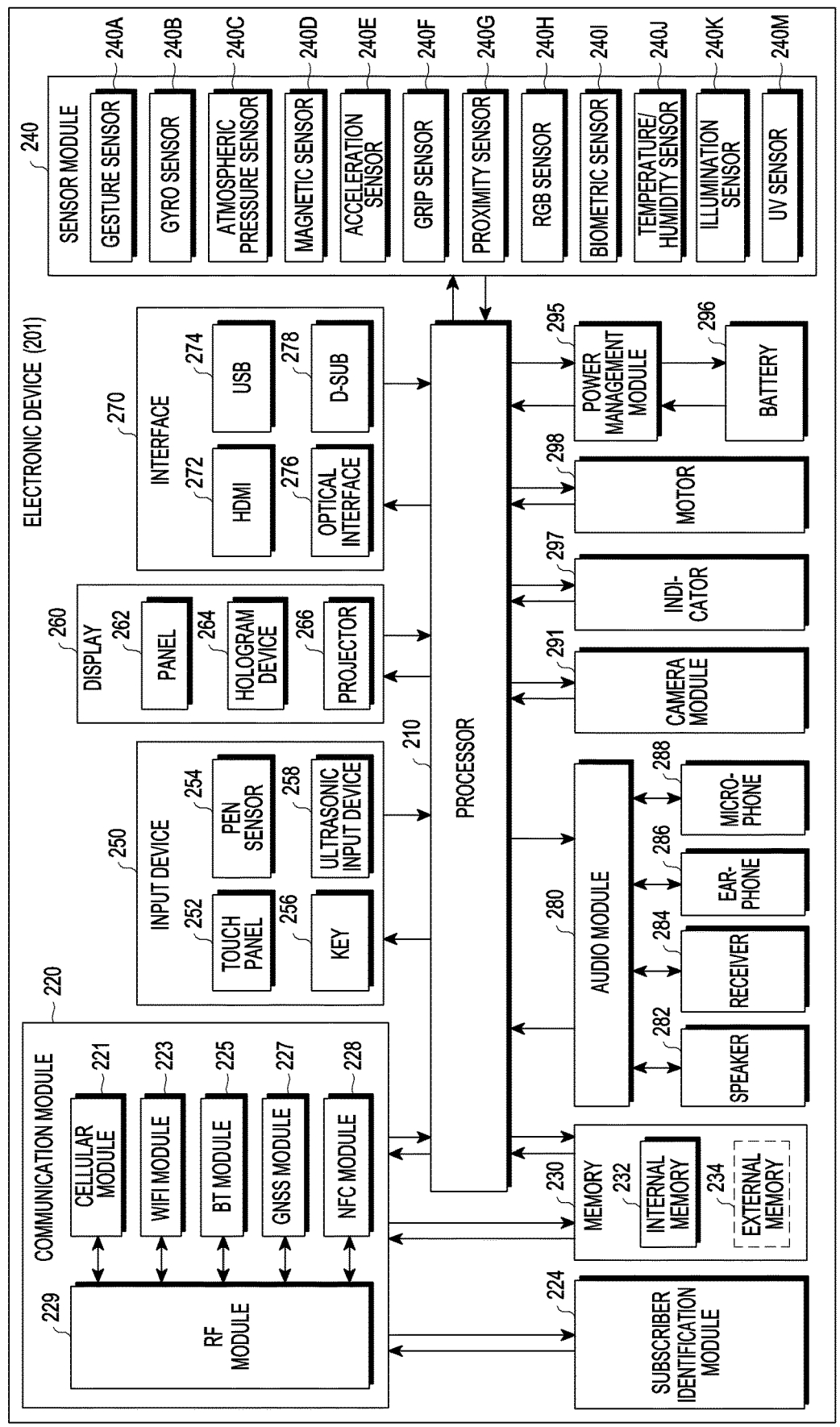
FIG. 2 is a block diagram illustrating an electronic device according to various embodiments.

FIG. 2 is a block diagram of an electronic device 201 according to various embodiments. The electronic device 201 may include, for example, the whole or part of the electronic device 101 illustrated in FIG. 1. The electronic device 201 may include at least one processor 210 (e.g., an AP), a communication module 220, a subscriber identification module 224, a memory 230, a sensor module 240, an input device 250, a display 260, an interface 270, an audio module 280, a camera module 291, a power management module 295, a battery 296, an indicator 297, and a motor 298. The processor 210 may control a plurality of hardware or software elements connected thereto and may perform various data processing and operations by driving an operating system or an application program. The processor 210 may be implemented by, for example, a System on Chip (SoC). According to an embodiment, the processor 210 may further include a graphic processing unit (GPU) and/or an image signal processor. The processor 210 may also include at least some of the elements illustrated in FIG. 2 (for example, a cellular module 221). The processor 210 may load, in volatile memory, instructions or data received from at least one of the other elements (for example, non-volatile memory), process the loaded instructions or data, and store the resultant data in the non-volatile memory.

The communication module 220 may have a configuration that is the same as, or similar to, that of the communication interface 170. The communication module 220 (for example, the communication interface 170) may include, for example, a cellular module 221, a Wi-Fi module 223, a Bluetooth module 225, a GNSS module 227, an NFC module 228, and an RF module 229. The cellular module 221 may provide, for example, a voice call, a video call, a text message service, an Internet service, or the like through a communication network. According to an embodiment, the cellular module 221 may identify and authenticate the electronic device 201 within a communication network using the subscriber identification module 224 (for example, a SIM card). According to an embodiment, the cellular module 221 may perform at least some of the functions that the processor 210 may provide. According to an embodiment, the cellular module 221 may include a communication processor (CP). In some embodiments, at least some (two or more) of the cellular module 221, the Wi-Fi module 223, the Bluetooth module 225, the GNSS module 227, and the NFC module 228 may be included in a single Integrated Chip (IC) or IC package. The RF module 229 may transmit/receive, for example, a communication signal (for example, an RF signal). The RF module 229 may include, for example, a transceiver, a power amp module (PAM), a frequency filter, a low noise amplifier (LNA), an antenna, or the like. According to another embodiment, at least one of the cellular module 221, the Wi-Fi module 223, the BT module 225, the GPS module 227, and the NFC module 228 may transmit/receive an RF signal through a separate RF module. The subscriber identification module 224 may include, for example, a card that includes a subscriber identity module and/or an embedded SIM, and may contain unique identification information (for example, an Integrated Circuit Card Identifier (ICCID)) or subscriber information (for example, an International Mobile Subscriber Identity (IMSI)).

The memory 230 (for example, the memory 130) may include, for example, an internal memory 232 or an external memory 234. The internal memory 232 may include, for example, at least one of a volatile memory (for example, a DRAM, an SRAM, an SDRAM, or the like) and a non-volatile memory (for example, a One Time Programmable ROM (OTPROM), a PROM, an EPROM, an EEPROM, a mask ROM, a flash ROM, a flash memory, a hard disc drive, or a Solid State Drive (SSD)). The external memory 234 may include a flash drive, for example, a compact flash (CF), a secure digital (SD), a Micro-SD, a Mini-SD, an eXtreme digital (xD), a multi-media card (MMC), a memory stick, and the like. The external memory 234 may be functionally or physically connected to the electronic device 201 through various interfaces.

The sensor module 240 may, for example, measure a physical quantity or detect the operating state of the electronic device 201 and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, an illumination sensor 240K, and an ultraviolet (UV) sensor 240M. Additionally or alternatively, the sensor module 240 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments, the electronic device 201 may further include a processor configured to control the sensor module 240 as a part of or separately from the AP 210, and may control the sensor module 240 while the AP 210 is in a sleep state.

The input device 250 may include, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. Furthermore, the touch panel 252 may further include a control circuit. The touch panel 252 may further include a tactile layer to provide a tactile reaction to a user. The (digital) pen sensor 254 may include, for example, a recognition sheet that is a part of, or separate from, the touch panel. The key 256 may include, for example, a physical button, an optical key, or a keypad. The ultrasonic input device 258 may detect ultrasonic waves, which are generated by an input tool, through a microphone (for example, a microphone 288) to identify data corresponding to the detected ultrasonic waves.

The display 260 (for example, the display 160) may include a panel 262, a hologram device 264, a projector 266, and/or a control circuit for controlling them. The panel 262 may be implemented to be, for example, flexible, transparent, or wearable. The panel 262, together with the touch panel 252, may be configured as one or more modules. According to an embodiment, the panel 262 may include a pressure sensor (or a POS sensor) which may measure a strength of pressure of a user's touch. The pressure sensor may be implemented so as to be integrated with the touch panel 252 or may be implemented as one or more sensors separate from the touch panel 252. The hologram device 264 may show a three dimensional image in the air by using an interference of light. The projector 266 may display an image by projecting light onto a screen. The screen may be located, for example, in the interior of, or on the exterior of, the electronic device 201. The interface 270 may include, for example, an HDMI 272, a USB 274, an optical interface 276, or a D-subminiature (D-sub) 278. The interface 270 may be included in, for example, the communication circuit 170 illustrated in FIG. 1. Additionally or alternatively, the interface 270 may, for example, include a mobile high-definition link (MHL) interface, a secure digital (SD) card/ multi-media card (MMC) interface, or an infrared data association (IrDA) standard interface.

The audio module 280 may convert, for example, sound into an electrical signal, and vice versa. At least some elements of the audio module 280 may be included, for example, in the input/output interface 145 illustrated in FIG. 1. The audio module 280 may process sound information that is input or output through, for example, a speaker 282, a receiver 284, earphones 286, the microphone 288, and the like. The camera module 291 is a device that can photograph a still image and a moving image. According to an embodiment, the camera module 291 may include one or more image sensors (for example, a front sensor or a rear sensor), a lens, an image signal processor (ISP), or a flash (for example, an LED or xenon lamp). The power management module 295 may manage, for example, the power of the electronic device 201. According to an embodiment, the power management module 295 may include a power management integrated circuit (PMIC), a charger IC, or a battery or fuel gauge. The PMIC may use a wired and/or wireless charging method. Examples of the wireless charging method may include a magnetic resonance method, a magnetic induction method, an electromagnetic wave method, and the like. Additional circuits (for example, a coil loop, a resonance circuit, a rectifier, and the like) for wireless charging may be further included. The battery gauge may measure, for example, the residual amount of the battery 296 and a voltage, current, or temperature while charging. The battery 296 may include, for example, a rechargeable battery and/or a solar battery.

The indicator 297 may display a particular state, for example, a booting state, a message state, a charging state, or the like of the electronic device 201 or a part (for example, the processor 210) of the electronic device 201. The motor 298 may convert an electrical signal into a mechanical vibration and may generate a vibration, a haptic effect, or the like. The electronic device 201 may include a mobile TV support device that can process media data according to a standard, such as digital multimedia broadcasting (DMB), digital video broadcasting (DVB), mediaFlo™, and the like. Each of the above-described component elements of hardware according to the disclosure may be configured with one or more components, and the names of the corresponding component elements may vary based on the type of electronic device. In various embodiments, an electronic device (for example, the electronic device 201) may omit some elements or may further include additional elements, or some of the elements of the electronic device may be combined with each other to configure one entity, in which case the electronic device may identically perform the functions of the corresponding elements prior to the combination.

In various embodiments of the disclosure, an electronic device 201 (e.g., the electronic device 101) may include a communication circuit (e.g., a communication module 220); at least one processor 210 configured to be electrically connected to the communication circuit; and a memory 230 configured to be electrically connected to the processor 210. The memory 230 may store, when executed, instructions that cause the processor 210 to transmit first information about the state of the electronic device 201 through the communication circuit (e.g., a BT module 225) after the booting of the electronic device 201 is started and before the booting of the electronic device 201 is completed.

In various embodiments of the disclosure, the communication circuit may include a first communication circuit and a second communication circuit, the first information may be transmitted through the first communication circuit, and the first information may indicate at least one of a state in which the electronic device 201 is being currently booted, a state in which the booting of the first communication circuit (e.g., the BT module 225) is completed, and a state in which the second communication circuit (e.g., the Wi-Fi module 223) is being currently booted.

In various embodiments of the disclosure, the communication circuit may include a first communication circuit, the first communication circuit may be a BLE communication circuit (e.g., the BT module 225), and the first information may be configured to be included in an advertising packet according to BLE communication and transmitted.

In various embodiments of the disclosure, the processor 210 may be configured to transmit the first information in response to loading of the BLE communication driver.

In various embodiments of the disclosure, the communication circuit may include the second communication circuit, and the second communication circuit may be a Wi-Fi communication circuit (e.g., the Wi-Fi module 223).

In various embodiments of the disclosure, the processor 210 may store rebooting-related information (e.g., information about reasons for rebooting) in the memory 230 when the electronic device 201 is rebooted, and may allow the rebooting-related information (e.g., information about reasons for rebooting) to be included in the first information.

In various embodiments of the disclosure, the processor 210 may control a sensor (e.g., the sensor module 240) connected to the electronic device 201 using a control signal received through the second communication circuit (e.g., the Wi-Fi module 223), and may transmit the sensing information received from the sensor (e.g., the sensor module 240) to the first electronic device 101 or the server 106 through the second communication circuit (e.g., the Wi-Fi module 223).

In various embodiments of the disclosure, the communication circuit may include a first communication circuit and a second communication circuit, the first information may be transmitted through the first communication circuit, and a booting order of the first communication circuit may be ahead of a booting order of the second communication circuit in the booting order of the electronic device 201.

In various embodiments of the disclosure, the communication circuit may include a first communication circuit and a second communication circuit, the first information may be transmitted through the first communication circuit, and a time required for the booting of the first communication circuit may be shorter than a time required for the booting of the second communication circuit in a time required for the booting of the electronic device 201.

In various embodiments of the disclosure, the communication circuit may include a first communication circuit and a second communication circuit, and the memory 230 may further store, when executed, instructions that cause the processor 210 to transmit second information about the state of the electronic device 201 through the first communication circuit (e.g., the BT module 225) or the second communication circuit (e.g., the Wi-Fi module 223) when the booting of the second communication circuit (e.g., the Wi-Fi module 223) is completed or when the booting of the electronic device 201 is completed.

Figure 3:
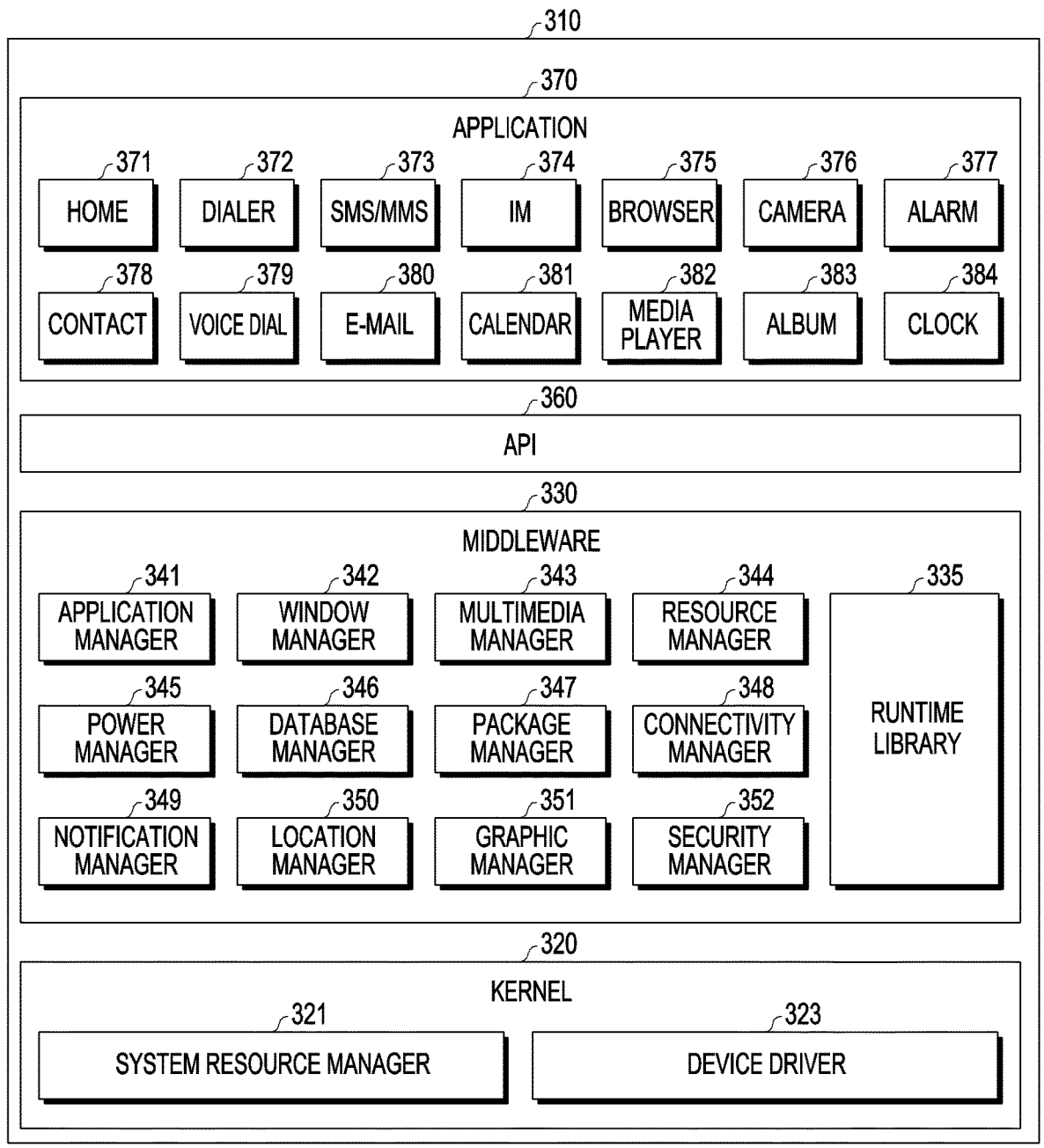
FIG. 3 is a block diagram illustrating a program module according to various embodiments.

FIG. 3 is a block diagram of a program module according to various embodiments. According to an embodiment, the program module 310 (for example, the program 140) may include an Operating System (OS) that controls resources relating to an electronic device (for example, the electronic device 101) and/or various applications (for example, the application programs 147) that are driven on the operating system. The operating system may include, for example, Android™, iOS™, Windows™, Symbian™, Tizen™, or Bada™. Referring to FIG. 3, the program module 310 may include a kernel 320 (for example, the kernel 141), middleware 330 (for example, the middleware 143), an API 360 (for example, the API 145), and/or applications 370 (for example, the application programs 147). At least a part of the program module 310 may be preloaded on the electronic device, or may be downloaded from an external electronic device (for example, the electronic device 102 or 104 or the server 106).

The kernel 320 may include, for example, a system resource manager 321 and/or a device driver 323. The system resource manager 321 may control, allocate, or retrieve system resources. According to an embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an inter-process communication (IPC) driver. The middleware 330 may provide, for example, a function required by the applications 370 in common, or may provide various functions to the applications 370 through the API 360 such that the applications 370 can efficiently use limited system resources within the electronic device. According to an embodiment, the middleware 330 may include at least one of a runtime library 335, an application manager 341, a window manager 342, a multi-media manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function through a programming language while the applications 370 are being executed. The runtime library 335 may manage an input/output, manage a memory, or process an arithmetic function. The application manager 341 may manage, for example, the life cycles of the applications 370. The window manager 342 may manage GUI resources used for a screen. The multimedia manager 343 may identify formats required for reproducing various media files and may encode or decode a media file using a codec suitable for the corresponding format. The resource manager 344 may manage the source code of the applications 370 or the space in memory. The power manager 345 may manage, for example, the capacity or power of a battery and may provide power information required for operating the electronic device. According to an embodiment, the power manager 345 may operate in conjunction with a basic input/output system (BIOS). The database manager 346 may, for example, generate, search, or change databases to be used by the applications 370. The package manager 347 may manage the installation or update of an application that is distributed in the form of a package file.

The connectivity manager 348 may manage, for example, a wireless connection. The notification manager 349 may provide information on an event (for example, an arrival message, an appointment, a proximity notification, or the like) to a user. The location manager 350 may manage, for example, the location information of the electronic device. The graphic manager 351 may manage a graphic effect to be provided to a user and a user interface relating to the graphic effect. The security manager 352 may provide, for example, system security or user authentication. According to an embodiment, the middleware 330 may include a telephony manager for managing a voice or video call function of the electronic device or a middleware module that is capable of forming a combination of the functions of the above-described elements. According to an embodiment, the middleware 330 may provide specialized modules according to the types of operation systems. Furthermore, the middleware 330 may dynamically remove some of the existing elements, or may add new elements. The API 360 is, for example, a set of API programming functions, and may be provided with different configurations depending on the operating system. For example, in the case of Android or iOS, one API set may be provided for each platform, and in the case of Tizen, two or more API sets may be provided for each platform.

The applications 370 may include, for example, applications such as a home 371, a dialer 372, an SMS/MMS 373, an instant message (IM) 374, a browser 375, a camera 376, an alarm 377, contacts 378, a voice dialer 379, an e-mail 380, a calendar 381, a media player 382, an album 383, a watch 384, healthcare (e.g., measuring exercise quantity or blood sugar), or environment information. According to an embodiment, the applications 370 may include an information exchange application that can support the exchange of information between the electronic device and an external electronic device. The information exchange application may include, for example, a notification relay application for relaying particular information to an external electronic device or a device management application for managing an external electronic device. For example, the notification relay application may relay notification information generated in the other applications of the electronic device to an external electronic device, or may receive notification information from an external electronic device to provide the received notification information to a user. A device management application may install, delete, or update the functions (e.g., a function of turning on/off the external electronic device itself {or some components} or a function of adjusting the brightness {or a resolution} of the display) of an external electronic device communicating with, for example, an electronic device or applications operating in the external electronic device. According to an embodiment, the applications 370 may include applications (for example, a health care application of a mobile medical appliance) that are designated according to the attributes of an external electronic device. According to an embodiment, the applications 370 may include applications received from an external electronic device. At least some of the program module 310 may be implemented (for example, executed) by software, firmware, hardware (for example, the processor 210), or a combination of two or more thereof and may include a module, a program, a routine, an instruction set, or a process for performing one or more functions.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an Application-Specific Integrated Circuit (ASIC) chip, a Field-Programmable Gate Arrays (FPGA), or a programmable-logic device, which has been known or are to be developed in the future, for performing certain operations. At least some of devices (e.g., modules or functions thereof) or methods (e.g., operations) according to various embodiments may be implemented by an instruction which is stored a computer-readable storage medium (e.g., the memory 130) in the form of a program module. The instruction, when executed by a processor (e.g., the processor 120), may cause the one or more processors to execute the function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code made by a compiler or a code that can be executed by an interpreter. The programming module according to the disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

Figure 4:
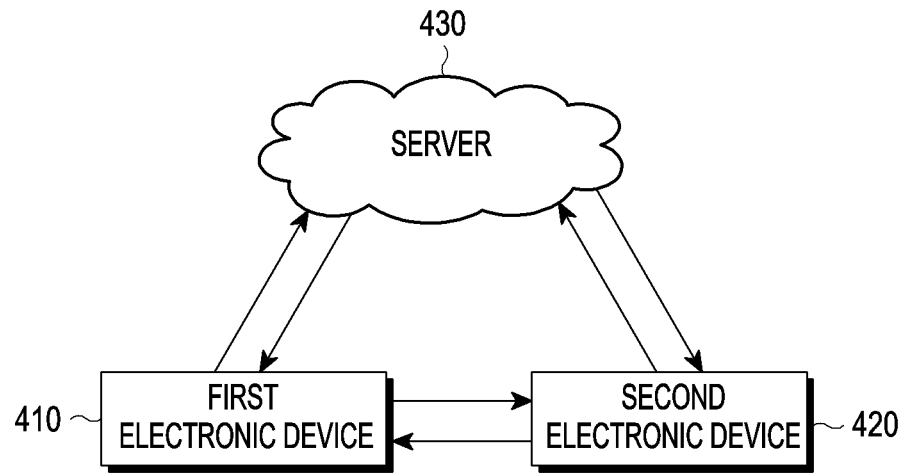
FIG. 4 is a conceptual diagram illustrating the interaction between electronic devices according to various embodiments.

FIG. 4 is a conceptual diagram illustrating the interaction between electronic devices according to various embodiments. Referring to FIG. 4, a first electronic device 410 including a plurality of communication circuits, a second electronic device 420 including a plurality of communication circuits, and a server 430 may be illustrated. The first electronic device 410 may be an Internet of Things (IoT) device. For example, the first electronic device 410 may be a router (e.g., a Wi-Fi router) that includes a Wi-Fi communication circuit and a short-range wireless communication circuit (e.g., a Bluetooth low energy {BLE} communication circuit or an NFC communication circuit).

The second electronic device 420 may be a user mobile device 420 (e.g., a smartphone) in which an application capable of controlling a sensor or the like connected to the first electronic device 410 is installed through the first electronic device 410. The second electronic device 420 may include a Wi-Fi communication circuit and a short-range wireless communication (e.g., a BLE communication circuit or an NFC communication circuit).

The server 430 may be a cloud server, and may be accessed using user account information via a wireless network (e.g., Wi-Fi communication). If the first electronic device 410 is registered with a first user account and the second electronic device 420 is also registered with the first user account or if the first electronic device 410 or the second electronic device 420 accesses the first user account through the server 430, the first electronic device 410 and/or the second electronic device 420 may transmit or receive data to or from the first electronic device 410 and/or the second electronic device 420.

Alternatively, the first electronic device 410 may directly transmit or receive data to or from a short-range wireless communication circuit included in the second electronic device 420 using a short-range wireless communication circuit included in the first electronic device 410. For example, the first electronic device 410 may transmit or receive data to and from the second electronic device 410 through a BLE communication circuit included in the first electronic device 410 or a BLE communication circuit included in the second electronic device 420. Alternatively, the first electronic device 410 may transmit or receive data to or from the second electronic device 420 through an NFC communication circuit included in the first electronic device 410 and an NFC communication circuit included in the second electronic device 420.

Figure 5:
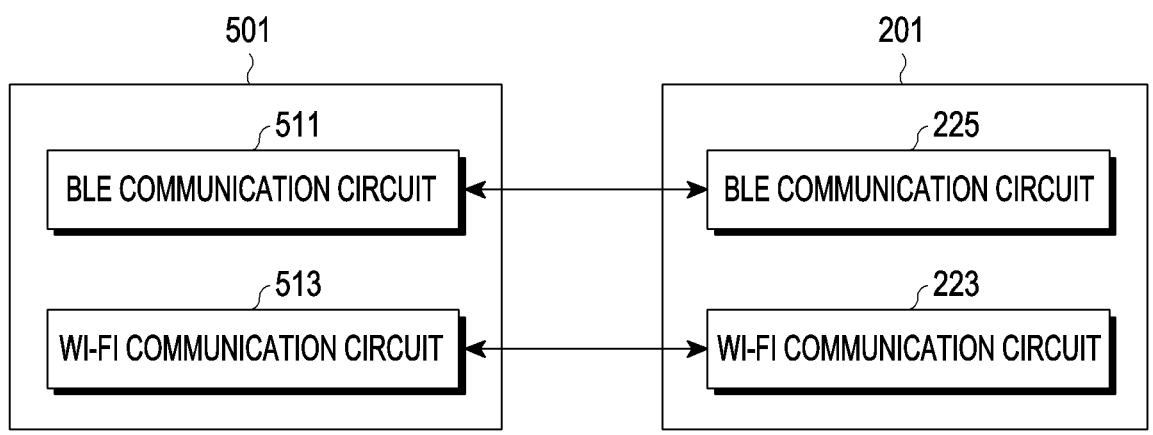
FIG. 5 is a conceptual diagram illustrating the interaction between two electronic devices including a plurality of communication circuits according to various embodiments.

FIG. 5 is a conceptual diagram illustrating the interaction between two electronic devices 510 and 201 including a plurality of communication circuits according to various embodiments. The electronic device 201 (hereinafter, the electronic device 201 may be referred to as a first electronic device and the electronic device 501 may be referred to as a second electronic device) may include short-range wireless communication circuits 225 and 511 and Wi-Fi communication circuits 223 and 513, respectively. The first electronic device 201 may be connected to the short-range wireless communication circuit 511 of the second electronic device 501 through the short-range wireless communication circuit 225. If the short-range wireless communication circuit is, for example, a BLE communication circuit, the first electronic device 201 may advertise data to any other electronic device having a BLE communication circuit without designating a recipient (e.g., the second electronic device 501). The second electronic device 501 may include the short-range wireless communication circuit 511, for example, a BLE communication circuit, and may receive the data advertised by an arbitrary BLE communication circuit.

The first electronic device 201 may transmit or receive data to or from the Wi-Fi communication circuit 513 of the second electronic device 501 through the Wi-Fi communication circuit 223.

When the first electronic device 201 and the second electronic device 501 are physically located adjacent to each other, data may be transmitted or received via short-range wireless communication (e.g., BLE communication or NFC communication) or Wi-Fi communication. However, when the first electronic device 201 and the second electronic device 501 are physically distant and cannot perform short-range wireless communication, data may be transmitted or received only via Wi-Fi communication.

The first electronic device 201 may be implemented as a smartphone provided with an application for connecting to an IoT device, and the second electronic device 501 may be implemented as a router that is a Wi-Fi router among the IoT devices. That is, the smartphone and the router can transmit and receive data through a short-range wireless communication circuit or a Wi-Fi communication circuit. The second electronic device 501 may be one of various IoT devices, for example, a refrigerator, a boiler, a TV, an air conditioner, a robot cleaner, an unmanned camera, a home robot, and the like. In addition, the first electronic device 201 may be a device having a user interface provided with an application for controlling the second electronic device 501, for example, a smartphone, a PC, a tablet, or the like. The first electronic device and the second electronic device are not limited to the above examples, but may be variously embodied according to various embodiments of the disclosure.

Figure 6:
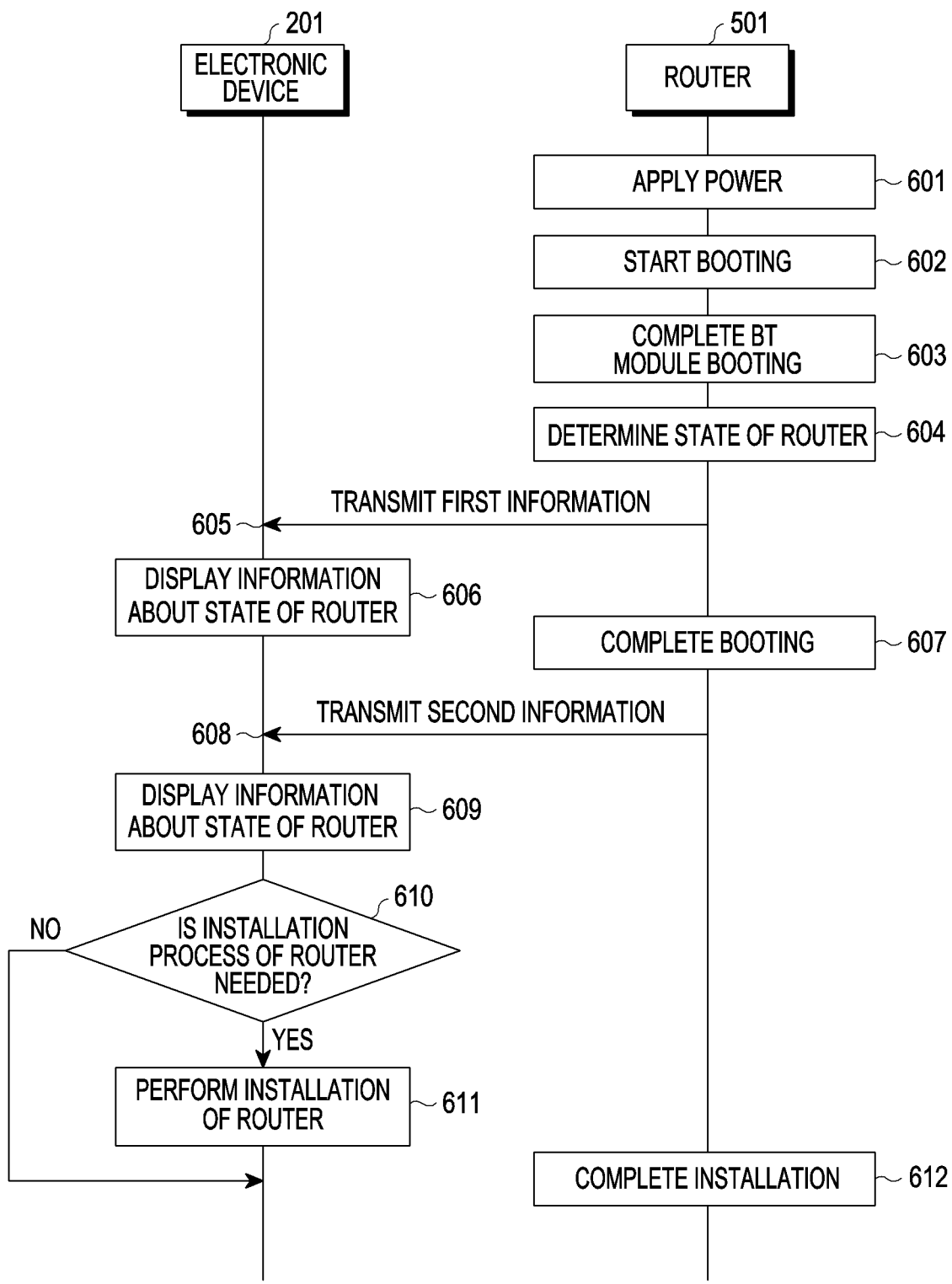
FIG. 6 is a flowchart illustrating the operation of an electronic device according to various embodiments and the operation a router connected to the electronic device in a process in which the router is booted.

FIG. 6 is a flowchart illustrating the operation of the electronic device 201 according to various embodiments and the operation the router 501 connected to the electronic device in a process in which the router is booted. A scenario in which the electronic device 201 receives information of the router 501 that is being currently booted and proceeds with the initial installation of the router 501 will be described. The router 501 is an example of the second electronic device 501 of FIG. 5 which is used for describing the scenario of FIG. 6. The router 501 of FIG. 6 may be one of various IoT devices in the same manner as in the second electronic device 501 of FIG. 5. The electronic device 201 and the router 501 in FIG. 6 may each include a plurality of communication circuits. For example, the electronic device 201 may include a short-range wireless communication circuit (e.g., a BLE communication circuit or an NFC communication circuit) and a Wi-Fi communication circuit, and the router 501 may also include a short-range wireless communication circuit (e.g., a BLE communication circuit or an NFC communication circuit) and a Wi-Fi communication circuit. For example, the electronic device 201 may transmit and receive data to and from the router 501 via the short-range wireless communication circuit and/or the Wi-Fi communication circuit, and the router 501 may also transmit and receive data to and from the electronic device 201 via the short-range wireless communication circuit and/or the Wi-Fi communication circuit. Data may be transmitted and received through each short-range wireless communication circuit when the electronic device 201 and the router 501 are connected to each other according to the short-range wireless communication, and data may be transmitted and received through each Wi-Fi communication circuit when the electronic device 201 and the router 501 are connected to each other according to the Wi-Fi communication.

In operation 601, power may be applied to the router 501.

In operation 602, the router 501 may start booting using a boot file stored in the router 501. For example, the booting of a plurality of modules included in the router 501 may be sequentially started and completed.

In operation 603, the booting of a BT communication module may be completed. The BT communication module may include, for example, a BLE communication circuit. The time when operation 603 is completed may correspond to the time after a driver for the BLE communication circuit is loaded and before the booting of all the modules included in the router 501 is completed. For example, the time when operation 603 is completed may correspond to the time before the booting of an operating system for accessing the BLE communication circuit is completed.

In operation 604, the router 501 may determine the state of the router 501. The state of the router 501 may include at least one of a state in which the router is initially booted, a state in which the router is rebooted, a state in which the installation process of the router is completed, a state in which the installation process of the router is needed, a state in which the router is initialized, and a state in which the router is not bootable. For example, the state in which the router is initially booted, that is, initial booting may refer to a booting state in which the initial installation process is not been performed in the router 501. The initial installation is a state in which essential configuration information such as a user registration to the router 501 is not input and the user registration or account registration for the router 501 may be performed through the electronic device 201 that wants to use the router 501. The electronic device 201 that has performed the user registration for the router 501 can access and control the router 501 and can exchange data with the router 501. The router 501 may identify the state of the router through a specific flag. For example, the router 501 may identify whether the initial booting of the router is performed, whether the router is rebooted, a reason for rebooting, and the like. For example, the router may identify whether the rebooting is caused due to system upgrade, overheating, or user reset, whether the corresponding booting is rebooting, whether the corresponding booting is initial booting, and the like. However, this identification is performed before the booting is completed, a processor operating according to the operating system of the router cannot confirm the state of the router 501. For example, the processor included in a BLE communication circuit may identify a specific flag value included on the BLE communication circuit to determine the state of the router 501. For example, the state in which the router 501 is initially booted may be confirmed according to the specific flag value included in the BLE communication circuit.

In operation 605, first information about the state of the router 501 may be transmitted using the BT communication module. For example, the BT communication module including the BLE communication circuit may not designate a recipient of data when advertising data, and a physically adjacent electronic device including the BLE communication circuit may receive the advertised data. The advertised data may include only simple information such as the identification number of the electronic device, and the first information may include a state in which the router is being currently booted or a state in which the booting of the BT communication module included in the router is completed. In addition, the first information may include state information indicating that another communication circuit included in the router, for example, a Wi-Fi communication module is being currently booted. The Wi-Fi communication module may include, for example, a Wi-Fi communication circuit. As to the first information, a flag value may be designated at a specific position within an advertising packet so that a device receiving the first information may confirm the identification information of the router and the state in which the router is being currently booted.

In operation 606, the electronic device 201 may display information about the state of the router on the basis of the received first information. For example, a guidance message such as "Router is found" or "Router is currently being booted" may be displayed through a display included in the electronic device 201. Alternatively, guidance messages may be displayed, such as "Router is currently rebooting after system upgrade", "Router is currently rebooting due to overheating. If this symptom is repeated, please contact service", "Router is rebooted due to user reset", "Router is being currently rebooted due to unknown reasons. If this symptom is repeated, please contact service", and the like. For example, the router 501 may store rebooting-related information (e.g., information about reasons for rebooting) before the rebooting, and may confirm and transmit the stored rebooting-related information at the time of rebooting. For example, when a user executes a reset, information about the reset by the user may be stored. When rebooting is performed after upgrading an SW, information about the rebooting by upgrading may be stored. When the system is rebooted due to overheating, information about the rebooting due to overheating may be stored. It is possible to output a designated alert tone in response to data reception through an audio included in the electronic device 201. It is possible to output a designated vibration in response to data reception through a motor included in the electronic device.

In operation 607, the booting of the router 501 may be completed. Since the Wi-Fi communication circuit is included in the router, the booting of the Wi-Fi communication circuit may be completed when the booting of the router 501 is completed. Through the Wi-Fi communication circuit and the BLE communication circuit, the router can be seen to be able to transmit and receive data.

In operation 608, second information indicating the state of the router 501 may be transmitted through the BLE communication circuit or the Wi-Fi communication circuit. If the electronic device and the BLE communication are connected, the second information may be transmitted directly to the electronic device through the BLE communication circuit. Alternatively, the second information may be transmitted to the electronic device through the Wi-Fi communication circuit.

In operation 609, the electronic device 201 may display information about the state of the router on the basis of the received second information. For example, the electronic device 201 may output information about completion of the booting of the router 501 as a text message, an image, a notification sound, a vibration, or the like.

In operation 610, the electronic device 201 may determine whether the installation process of the router 501 is needed. The electronic device 201 may confirm a state in which the installation of the router 501 is not completed on the basis of the second information, and may perform the installation of the router 501. The installation of the router 501 may include a process in which a user inputs user account information so that the user can use the router 501 and a process of connecting the router 501 to the electronic device 201.

In operation 611, the electronic device 201 may perform the installation of the router 501 on the basis of account information registered in the electronic device 201. The router 501 may be added to the electronic device 201 using the account information input through the user interface of the electronic device 201. For example, the electronic device 201 may add the router 501 using the account information of the electronic device and identification information of the router included in the second information.

In operation 612, the installation of the router 501 may be completed by the electronic device 201. The router 501 may transmit and receive data to and from another device (e.g., the electronic device 201 or the server) connected to the router on the basis of the account information of the router 501.

An electronic device (e.g., the router 501) according to an embodiment may include a first module and a second module that can control a communication circuit. For example, during the booting of the electronic device, the booting of the first module may be first completed and then the second module may be booted. For example, the first module (e.g., a Wi-Fi driver) of the electronic device may transmit the first information through a communication module (e.g., a Wi-Fi communication module or the like), and the second module (e.g., an application or a processor) may transmit the second information through the communication module.

Figure 7:
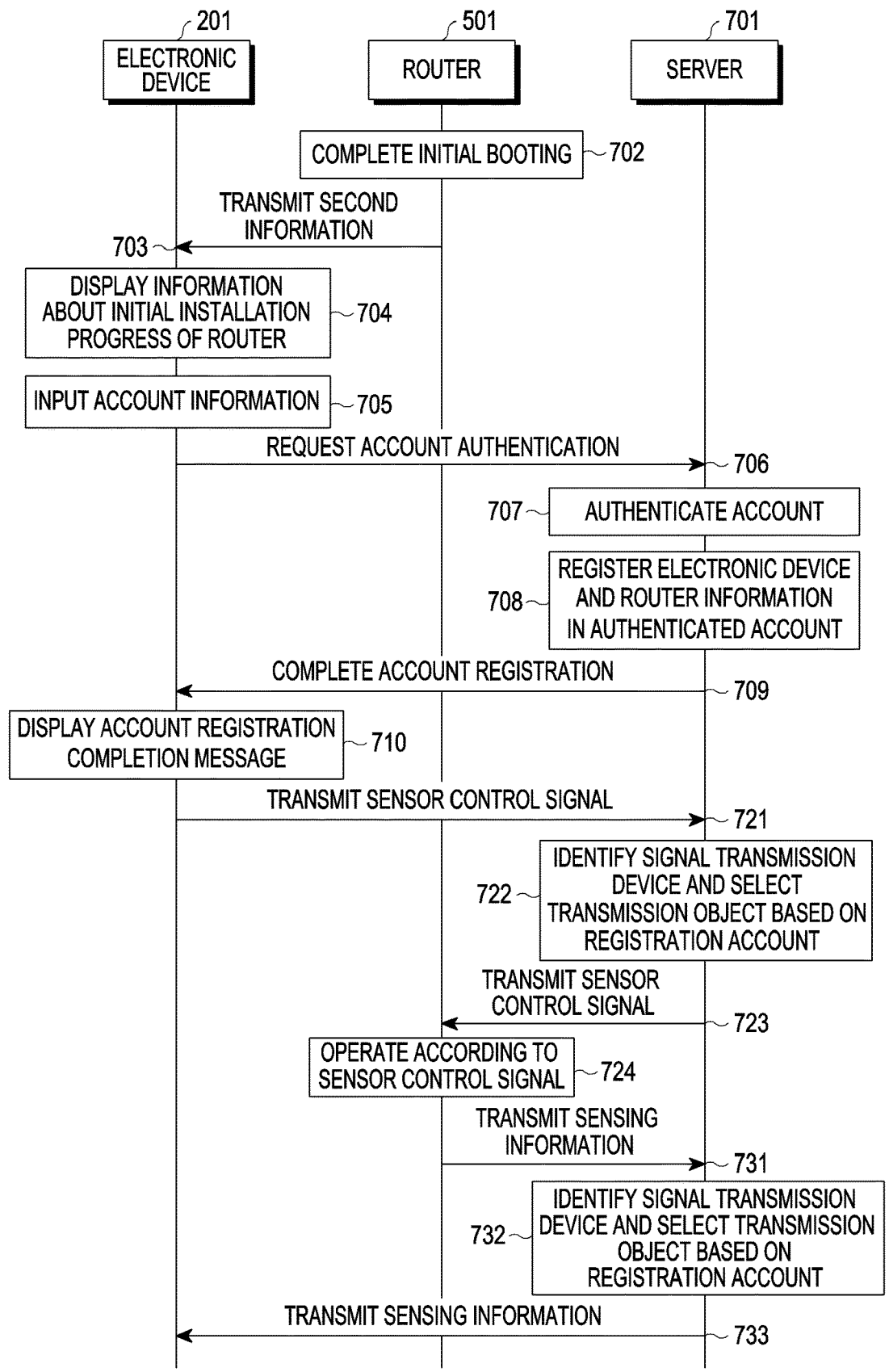
FIG. 7 is a flowchart illustrating the operations of an electronic device according to various embodiments, a router connected to the electronic device, and a server in a process in which the router is booted.

FIG. 7 is a flowchart illustrating the operations of the electronic device 201 according to various embodiments, the router 501 connected to the electronic device 201, and a server 701 in a process in which the router is booted. Hereinafter, a scenario in which the electronic device 201 adds the router 501 from the point of time at which the initial booting of the router 501 is completed and the electronic device 201 and the router 501 transmit or receive data through the server 701 will be described.

In operation 702, the initial booting of the router 501 may be completed. Operation 607 of FIG. 6 may be applied to operation 702. For example, the completion of the initial booting may refer to a state in which the router 501 can be initially installed at the point of time at which the initial installation of the router 501 is needed, that is, an available state.

In operation 703, when the router 501 includes a communication circuit included in the router 501, for example, a BLE communication circuit and a Wi-Fi communication circuit, second information indicating the state of the router 501 may be transmitted using at least one of the BLE communication circuit or the Wi-Fi communication circuit. The second information may indicate a state in which the booting of the router 501 is completed or a state in which the booting of the Wi-Fi communication circuit included in the router is completed.

In operation 704, the electronic device 201 may display information about the initial installation progress of the router 501 on the basis of the received second information. Guidance information about the initial installation progress may be output as text or an image.

In operation 705, the electronic device 201 may receive account information from a user through a user interface. The account information may include ID and password information for the account that is registered for the electronic device by the user, and may refer to information about the account for which the router is to be registered.

In operation 706, the electronic device 201 may store account information using the received account information, and may request account authentication from the server 701.

In operation 707, the server 701 may identify the received account information, and may authenticate the account by determining whether the corresponding request is an account authentication request transmitted by the electronic device 201 according to the registered account information.

In operation 708, the server 701 may register electronic device and router information in the authenticated account. Next, the electronic device and the router may transmit or receive data to or from the authenticated account using the account information.

In operation 709, the server 701 may transmit an account registration completion signal to a first electronic device. Alternatively, the server 701 may transmit the account registration completion signal to the router 501 (not shown).

In operation 710, the electronic device 201 may display an account registration completion message in response to the account registration completion signal.

In operation 721, the electronic device 201 may transmit a sensor control signal for controlling a sensor connected to the router 501 to the server 701 using the account information. Operation 721 may not be substantially performed consecutively with operation 710.

In operation 722, the server 701 may receive the sensor control signal from the electronic device 201, may identify the electronic device 201, and then may search for the router 501 registered in the account of the electronic device 201, thereby selecting a transmission object to which the sensor control signal is to be transmitted.

In operation 723, the server 701 may transmit the received sensor control signal to the router 501, which is the transmission object, selected on the basis of the registered account.

In operation 724, the router 501 may receive the sensor control signal and may perform a control operation on the sensor connected to the router 501. When a control signal for turning off a lamp connected to the router 501 is received, a control operation for turning off the corresponding lamp may be executed. According to one example, the router 501 may include a communication module such as Zigbee, Z-Wave, DECT ultra low energy (DECT ULE), BLE, or the like, and may transmit a command to the sensor through the communication module.

In operation 731, the router 501 may transmit sensing information generated by the sensor to the server 701 using the registered account information. For example, the sensor may be a lamp, and the sensing information may indicate that the lamp is turned off. Operation 731 may not be substantially performed consecutively with operation 724.

In operation 732, the server 701 may identify device to which the received sensing information is transmitted, and may search for a transmission object to which the received sensing information is to be transmitted on the basis of the registered account, thereby selecting the transmission object.

In operation 733, the server 701 may transmit the received sensing information to the selected electronic device 201. For example, sensing information about a state in which the lamp is turned off may be received at the electronic device 201 that has transmitted the control signal for turning off the lamp connected to the router 501.

Figure 8:
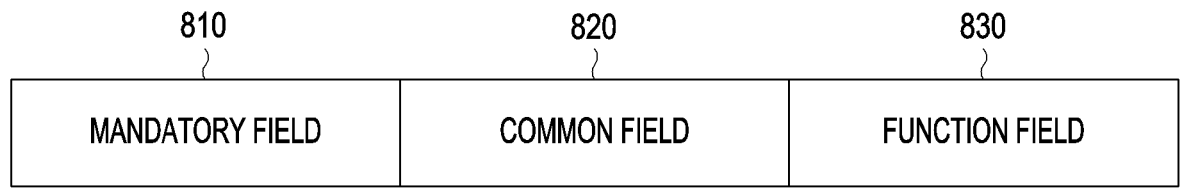
FIG. 8 is a conceptual diagram illustrating a data structure of an advertising packet according to Bluetooth low energy (BLE) communication according to various embodiments.
Figure 9:
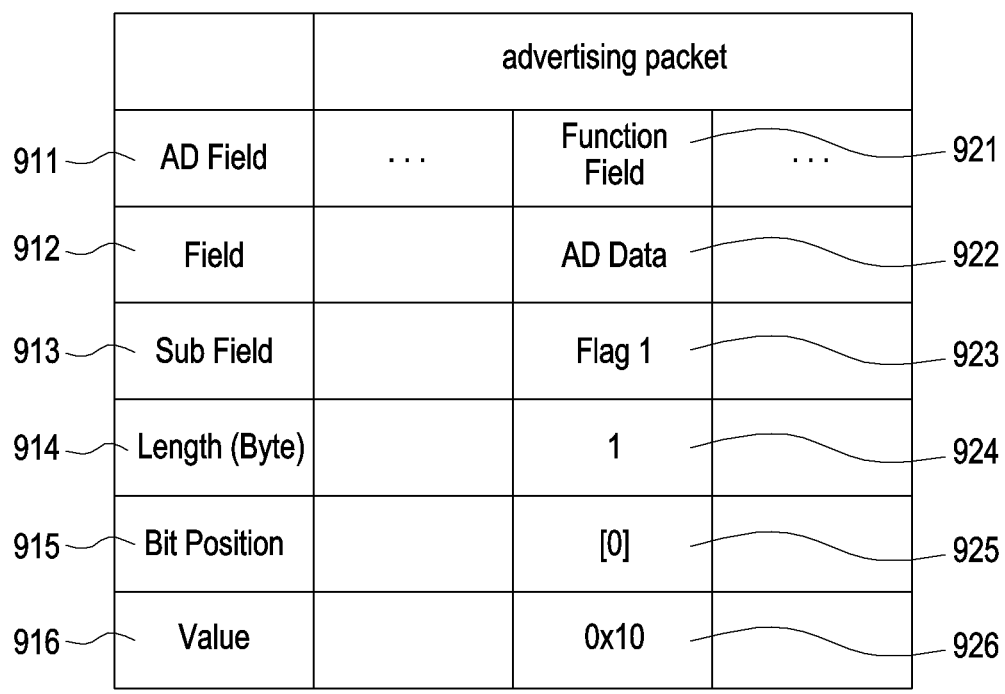
FIG. 9 is an example showing first information using an advertising packet according to BLE communication according to various embodiments.

FIG. 8 is a conceptual diagram illustrating a data structure of an advertising packet according to BLE communication according to various embodiments. The BLE communication may transmit data according to a designated data structure without designating a recipient. Here, an advertising signal may be given as an example of the data. The advertising packet may comply with the BLE communication standard and may include a mandatory field 810, a common field 820, and a function field 830 as shown in FIG. 8. According to various embodiments of the disclosure, data including first information may be generated, transmitted, and received according to the structure of the advertising packet. For example, as shown in Table 1, the mandatory field 810 included in the structure of the advertising (AD) packet may include items such as AD length, AD type, AD data (flags), AD length of AD data, and AD type of the AD data, and may include an AD field, a sub field, a length (Byte), a bit f for example, a second communication circuit is being currently booted. Further, the first information may indicate a state in which the booting of the first communication circuit is completed position, and a value for each item.

communication. For example, the first information may be designated as shown in FIG. 9, and will be described later in FIG. 9. An advertising signal may be configured to be transmitted in response to the driver of the BLE communication circuit being loaded. That is, when the BLE communication booting is completed, the advertising signal including the first information may be transmitted even before the booting of the electronic device including the BLE communication circuit is completed (for example, before the booting of other modules other than the BT module included in the electronic device is completed).

FIG. 9 is an example showing first information using an advertising packet according to BLE communication according to various embodiments. According to various embodiments, in the function field of the AD packet, as shown in Table 2, the value of "0x10" (926) may be designated in AD data 922 of the function field 921 as the value of a flag 1 (923) with respect to items such as AD field 911, field 912, sub field 913, length (byte) 914, bit position 915, and value 916. At this time, the length of flag 1 may be 1 byte (924) and the bit position of the flag value may be [0] (925).

Figure 10:
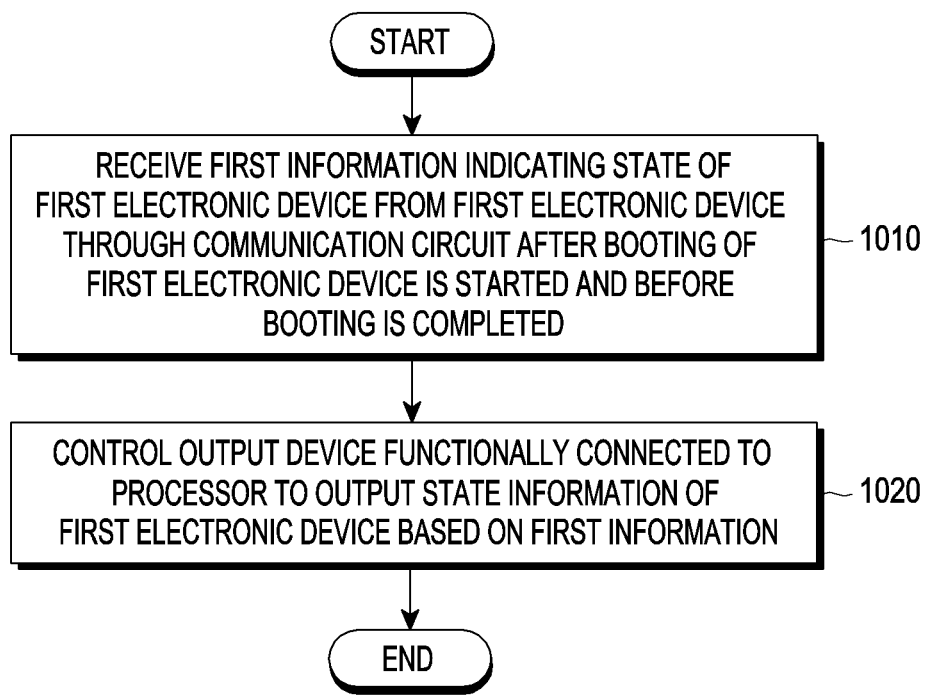
FIG. 10 is a flowchart illustrating a method of providing booting information of a first electronic device in an electronic device according to various embodiments of the disclosure.

FIG. 10 is a flowchart illustrating a method of providing booting information of a first electronic device 102 in an electronic device 101 according to various embodiments of the disclosure.

In operation 1010, the electronic device 101 (or a processor 120 or a processor 210) may receive first information indicating the state of the first electronic device 102 from the first electronic device 102 through the communication circuit after the booting of the first electronic device 102 is initiated and before the booting thereof is completed. The

TABLE 1

| | Mandatory Field | | | | | | | | | | | |
|---|---|---|---|---|---|---|---|---|---|---|---|---|
| AD Field | AD Length | AD Type | | | AD Data (Flags) | | | | | | AD Length | AD Type |
| Field Sub Field | Length | Type | | | Value | | | | | | Length | Type |
| Length (Byte) | 1 | 1 | | | 1 | | | | | | 1 | 1 |
| Bit Position | [7:0] | [7:0] | [7] | [6] | [5] | [4] | [3] | [2] | [1] | [0] | [7:0] | [7:0] |
| Value | 0x02 | 0x01 | | | | | | | | 0x06 | 0x0b | 0xff |

The function field 830 included in the structure of the AD packet may be implemented as shown in Table 2 below.

TABLE 2

| AD Field | Function Field AD Data (Manufacturer Specific Data) | | | | | | | | |
|---|---|---|---|---|---|---|---|---|---|
| Field Sub Field | Features | | | Length | EasySetup Version | | | Flag1 | |
| Length (Byte) | 1 | | | 1 | 1 | | | 1 | |
| Bit Position | [7] ... [1] | [0] | | [7:0] | [7] ... [1] | [0] | | [7] ... [1] | [0] |
| Value | | 0x10 | | 0x02 | | 0x01 | | | 0x10 |

According to various embodiments, the first information may be transmitted by designating a value "0x10" in [0] of a flag 1 included in the function field in Table 2 according to the structure of the AD packet. In response to the designation of the value of the flag 1 in Table 2, the value of the AD length of the mandatory field in Table 1 may be "0x0b". Various embodiments of the disclosure are not limited to the example of Table 2, and the first information may be determined in various ways according to the structure of the AD packet structure according to the BLE first electronic device may transmit the first information through a first communication circuit included in the first electronic device in response to the completion of the booting of the first communication circuit. For example, the completion of the booting of the first communication circuit in the first electronic device may include an operation in which one or more instructions (e.g., drivers) capable of controlling the first communication circuit are loaded into a memory. The electronic device 101 may include a plurality of communication circuits, for example, a BLE communication, a Wi-Fi communication, and the like. When the first information is an advertising signal according to the BLE communication, the first information may be received through the BLE communication circuit. The first information may indicate a state in which the first electronic device is being currently booted, a state in which the booting of the BLE communication circuit is completed as a specific module included in the first electronic device, for example, a first communication circuit, or a state in which the Wi-Fi communication circuit is being currently booted as another module included in the first electronic device, for example, a second communication circuit. The first information itself may include only simple information as the value of the designated flag and may be transmitted and received. However, the first information may have a designated data packet structure and may be configured as a designated flag value at a designated position within a designated data packet, thereby referring to designated information. For example, when the first information is designated as TRUE value to correspond to a first flag of the function field within the advertising packet according to the BLE communication, this means that a device transmitting the corresponding signal is currently booted. Specifically, the currently booting state may be subdivided into an initial booting state, a rebooting state, a booting state due to a system update, a booting state according to the initialization of an electronic device, and the like. In addition, since the first electronic device 102 that has transmitted the corresponding signal, i.e., the first information, transmits data in the structure of the advertising packet, the electronic device 101 may know the fact that the first electronic device 102 includes the BLE communication circuit supporting the structure of the advertising packet and the BLE communication circuit of the first electronic device 102 is usable, that is, the booting of the BLE communication circuit is completed. Further, when the electronic device 101 confirms that the first electronic device 102 is, for example, a router on the basis of identification information of the first electronic device 102 included in the advertising packet, the electronic device 101 may know the fact that a specific module which is booted after the BLE communication circuit according to information about the booting process of the router, for example, the Wi-Fi communication circuit is being currently booted.

In operation 1020, the electronic device 101 may control an output device functionally connected to the processor to output state information of the first electronic device 102 on the basis of the first information. Since the first information indicates a state in which the first electronic device is currently booted, a message such as "Router is found", "Router is being currently booted. Please, wait for a while", or the like may be output through, for example, a display included in the electronic device 101. Alternatively, a message such as "Do you want to connect to the retrieved router" may be output to allow a process of connecting the electronic device 101 and the router that is being currently booted to be performed. Alternatively, according to the type of the first electronic device identified on the basis of the first information, in the case of a router, a guidance message including information about the booting process of the router, a media message describing the booting process, information describing a normal booting process, information about an event occurring in the case of an abnormal booting process, information about a user action required to complete the booting of the router (e.g., cable connection, etc.), and the like may be provided to a user. The output device may include at least one of an audio device, a motor, and a display. Information about an event occurring in case of the abnormal booting process may be output through the display in various ways such as text, images, videos, sound, and the like. Alternatively, an operation example of the LED lamp of the router corresponding to the normal booting, an operation example of the LED lamp of the router corresponding to the abnormal booting, or an operation example of the LED lamp after the completion of the booting may be displayed through the display. It is also possible to output a designated notification sound in response to the reception of data, that is, the first information, or to output designated vibration.

Figure 11:
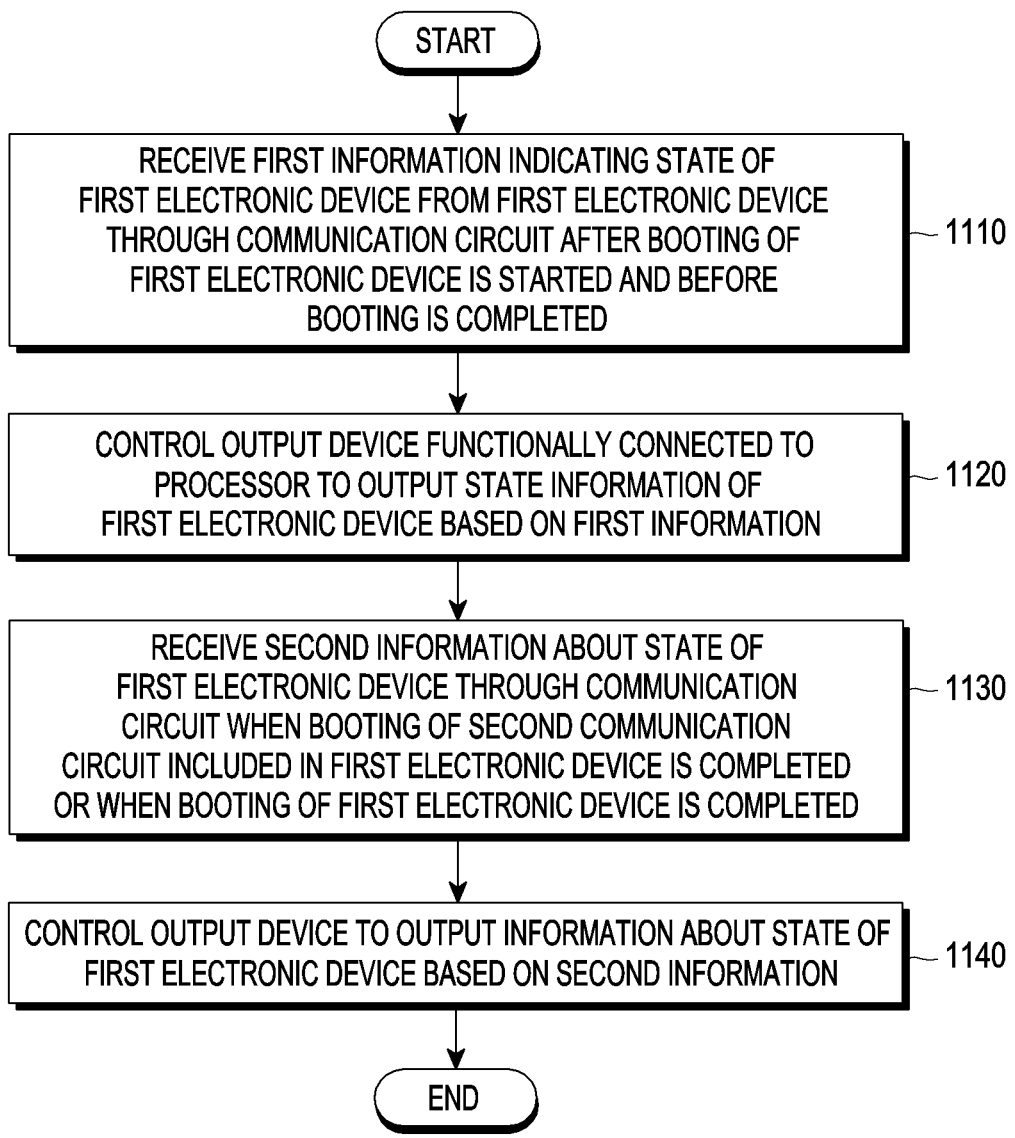
FIG. 11 is a flowchart illustrating a method of providing information for booting and installation of a first electronic device in an electronic device according to various embodiments of the disclosure.

FIG. 11 is a flowchart illustrating a method of providing information for booting and installation of a first electronic device in an electronic device according to various embodiments of the disclosure.

In operation 1110, an electronic device 101 (or a processor 120 or a processor 210) may receive, from a first electronic device 102, first information indicating the state of the first electronic device 102 through a communication circuit after the booting of the first electronic device 102 is initiated and before the booting thereof is completed. Operation 1010 of FIG. 10 may be applied.

In operation 1120, the electronic device 101 may control an output device functionally connected to the processor to output state information of the first electronic device 102 on the basis of the first information. Operation 1020 of FIG. 10 may be applied.

In operation 1130, the electronic device 101 may receive second information about the state of the first electronic device 102 through the communication circuit when the booting of a second communication circuit included in the first electronic device 102 is completed or when the booting of the first electronic device 102 is completed. When the booting of the second communication circuit is completed in the first electronic device 102 or when the booting including the second communication circuit is completed, the second information about the state of the first electronic device 102 may be transmitted through the second communication circuit. Alternatively, since the booting of the first communication circuit is completed in operation 1110, the second information about the state of the first electronic device 102 may be transmitted through the first communication circuit. The electronic device 101 may receive the second information, which is transmitted through the first communication circuit, through the same type of communication circuit as the first communication circuit, and may receive the second information, which is transmitted through the second communication circuit, through the same type of communication circuit as the second communication circuit. For example, when the first communication circuit of the first electronic device is a BLE communication circuit, the electronic device may receive the second information through the BLE communication circuit. When the second communication circuit of the first electronic device is a Wi-Fi communication circuit, the electronic device may receive the second information through the Wi-Fi communication circuit. The second information may indicate a state in which the booting of the first electronic device is completed or a state in which installation is required in the first electronic device. Alternatively, the second information may include information required for the installation of the first electronic device. Unlike the first information, the second information may directly include state information about the first electronic device and may be transmitted and received. A description required for the installation process of the first electronic device may also be included as media files such as text, images, and videos, and may be generated and transmitted without limitation to the type and size of data. The electronic device may read the second information directly to know the state in which the booting of the first electronic device is completed.

In operation 1140, the electronic device 101 may control the output device to output information about the installation progress of the first electronic device on the basis of the second information. If the first electronic device 102 is installable via the electronic device 101, the electronic device may perform the installation process of the first electronic device whose booting is completed on the basis of the received second information. In order to inform a user of the installation process and to request a data input such as account registration from the user, guidance for the installation progress may be provided to the user in various ways such as text, images, videos, sound, and the like. For example, if the first electronic device is a routing device, a message such as "Booting of the routing device is completed. Do you want to register the routing device?" may be output via a display functionally connected to the electronic device 101.

Figure 12:
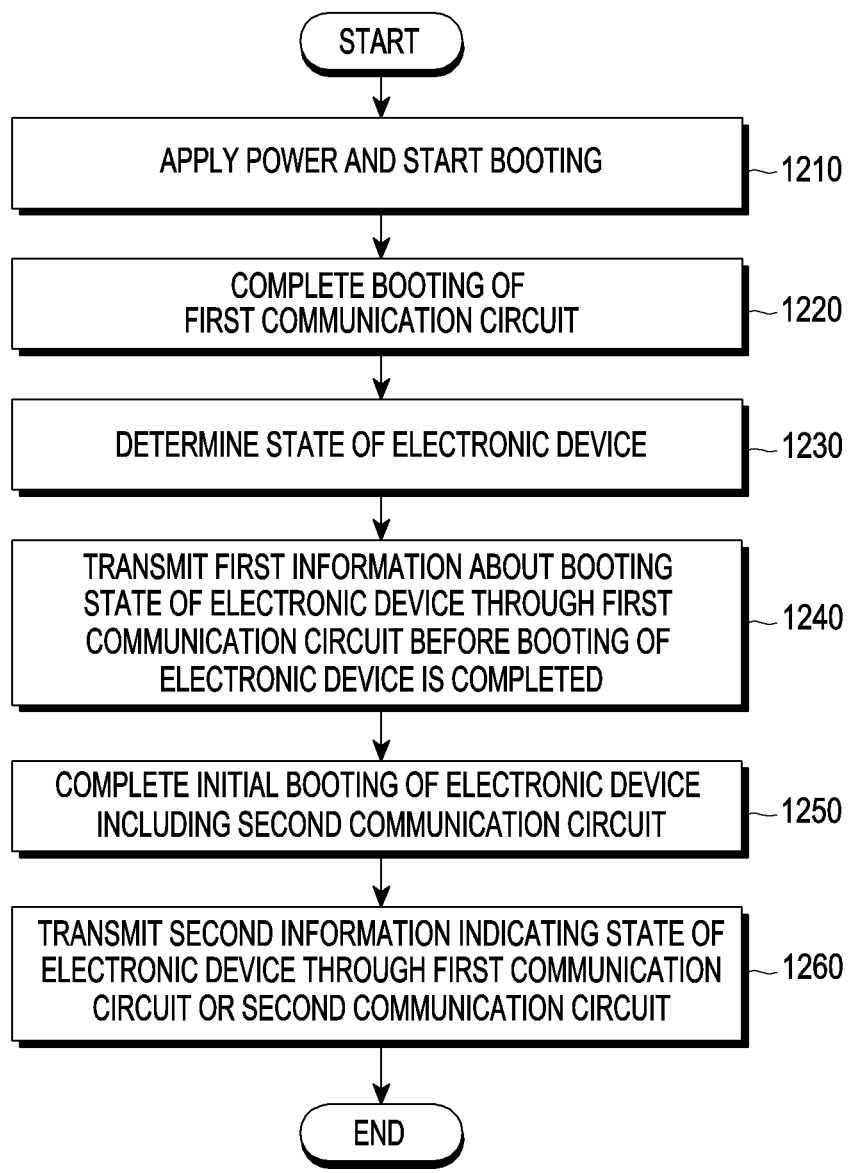
FIG. 12 is a flowchart illustrating a booting operation of an electronic device including a plurality of communication circuits according to various embodiments of the disclosure.

FIG. 12 is a flowchart illustrating a booting operation of an electronic device including a plurality of communication circuits according to various embodiments of the disclosure.

In operation 1210, the booting of an electronic device 101 (or a processor 120 or a processor 210) may be initiated. For example, power may be applied and the booting of the electronic device 101 may be started. Specifically, in order to start the electronic device 101, power may be applied to the electronic device 101 in various methods, for example, in which a power cord connected to the electronic device 101 is plugged into an outlet, a power button of the electronic device 101 is pushed, an auxiliary battery is connected and power is applied, and the like, so that the booting of the electronic device 101 may be started.

In operation 1220, the booting of the first electronic circuit of the electronic device 101 may be completed. The electronic device 101 may include a plurality of communication circuits and may include a first communication circuit and a second communication circuit. Further, the first communication circuit may be a BLE communication circuit, and the second communication circuit may be a Wi-Fi communication circuit. In the case of the BLE communication circuit, the size of the BLE communication circuit is smaller than that of the Wi-Fi communication circuit and a connection process with an external device such as an Internet cable may be unnecessary so that the booting time may be short. According to various embodiments of the disclosure, the booting order of the BLE communication circuit may relatively precede the booting order of the Wi-Fi communication circuit in the entire booting process of the electronic device 101. Accordingly, when the booting process of the electronic device is known, the point of time at which the booting of the BLE communication circuit is completed may indicate a state in which the electronic device is being currently booted or a state in which the Wi-Fi communication circuit included in the electronic device is being currently booted.

In operation 1230, the electronic device 101 may determine the state of the electronic device 101. The state of the electronic device 101 may indicate a state in which the initial booting is completed, a state in which the rebooting is completed, a state in which the booting according to system upgrade is completed, or a state in which the booting according to initialization is completed. For example, the state in which the initial booting is completed may refer to a state in which the booting is performed while the installation of the electronic device 101 is not completed, and a state requiring the installation may refer to a state where a default value to which information for the use of the electronic device 101 such as Wi-Fi account and user account registration is not input is set. As another example, the state in which the rebooting is completed may be relative to the state in which the initial booting is completed and may refer to a state where a setting value required for the use of the electronic device 101 is input such as the presence of the account registered in the electronic device 101. When the rebooting is completed, the electronic device 101 can transmit and receive data to and from another electronic device or a server using the registered account information.

In operation 1240, the electronic device 101 may transmit first information about the state of the electronic device 101 through the first communication circuit whose booting is completed before the booting of the electronic device 101 is completed. For example, when the first communication circuit is the BLE communication circuit, the electronic device 101 may transmit the first information using an advertising signal. The first information may indicate a state in which the electronic device 101 is current booted or a state in which another module included in the electronic device 101, for example, a second communication circuit is being currently booted. Further, the first information may indicate a state in which the booting of the first communication circuit is completed.

In operation 1250, the initial booting of the electronic device 101 including the second electronic circuit may be completed. After the initial booting is completed, the initial installation of the electronic device 101 may be performed. The second communication circuit may be, for example, a Wi-Fi communication circuit.

In operation 1260, the electronic device 101 may transmit the second information indicating the state of the electronic device 101 through the first communication circuit or the second communication circuit. The second information may indicate the state in which the initial booting of the electronic device is completed, and may include information requiring the initial installation process after the booting, guidance information about the initial installation process, a user input for the initial installation, and the like.

Figure 13:
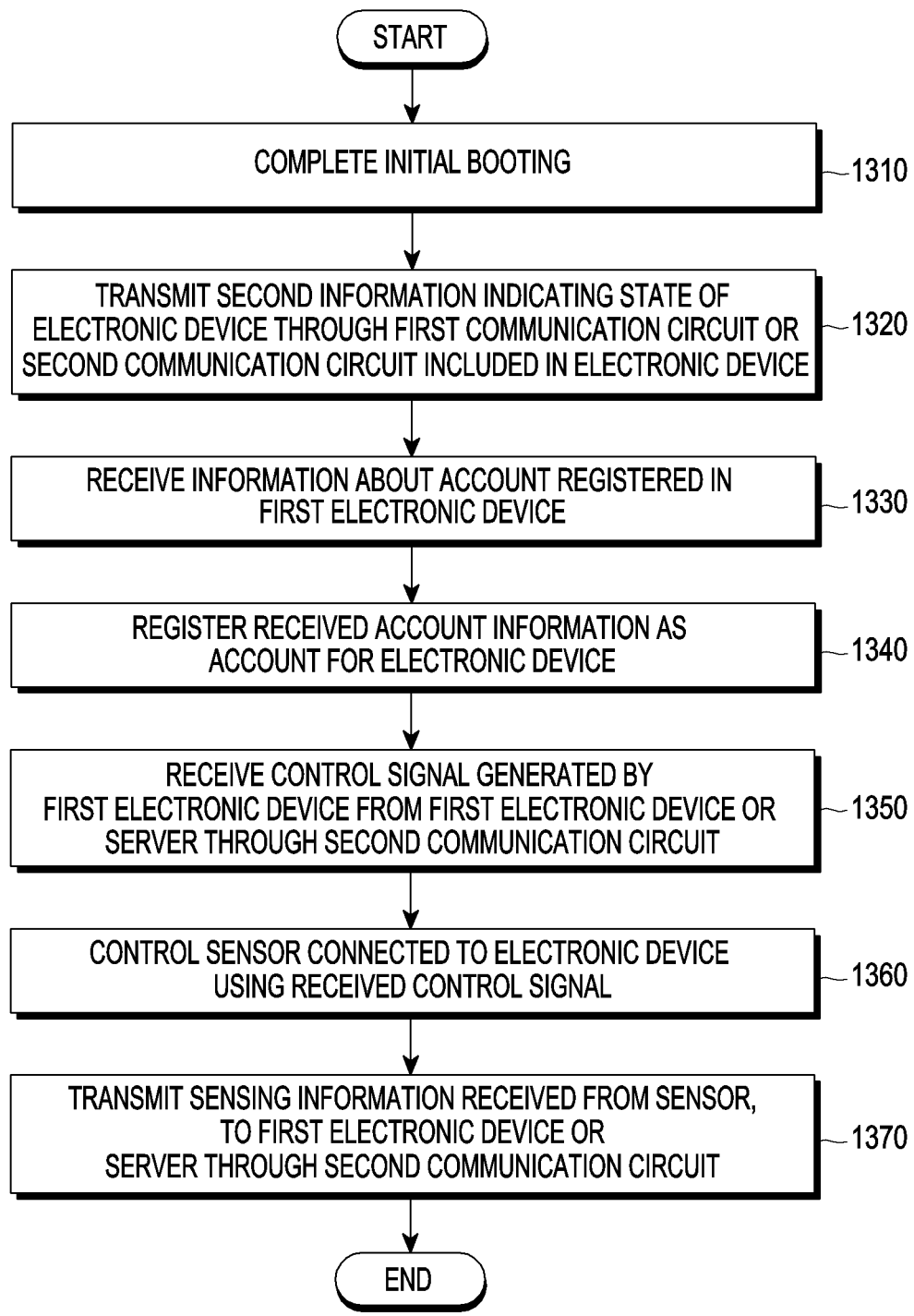
FIG. 13 is a flowchart illustrating booting and initial installation operations of an electronic device including a plurality of communication circuits according to various embodiments of the disclosure.

FIG. 13 is a flowchart illustrating booting and initial installation operations of the electronic device 101 including a plurality of communication circuits according to various embodiments of the disclosure.

In operation 1310, the initial booting of the electronic device 101 (or the processor 120 or the processor 210) may be completed. The above description of the state in which the initial booting is completed may be applied to the initial booting.

In operation 1320, the electronic device 101 may transmit second information indicating the state of the electronic device 101 through a first communication circuit or a second communication circuit included in the electronic device 101. The second information may include state information in which the booting of the electronic device 101 is completed, state information requiring the initial installation in the electronic device 101, and the like.

In operation 1330, the electronic device 101 may receive information about an account registered in a first electronic device. The first electronic device may indicate a device that wants to connect to the electronic device 101 using the account information.

In operation 1340, the electronic device 101 may register the received account information as the account for the electronic device 101. When the account information is registered, the electronic device 101 may transmit and receive data to and from another electronic device or a server on the basis of the account information.

In operation 1350, the electronic device 101 may receive a control signal generated by the first electronic device from the first electronic device or the server through a second communication circuit. The control signal may be received through the account information registered in the electronic device.

In operation 1360, the electronic device 101 may control a sensor connected to the electronic device using the received control signal. For example, when a lamp sensor is connected to the electronic device or when the received control signal is a signal for turning on the lamp sensor, the electronic device 101 may perform an operation of turning on the lamp sensor.

In operation 1370, the electronic device 101 may transmit sensing information received from the sensor, to the first electronic device or the server through the second communication circuit. The electronic device 101 may transmit the sensing information using the registered account information.

Figure 14A:
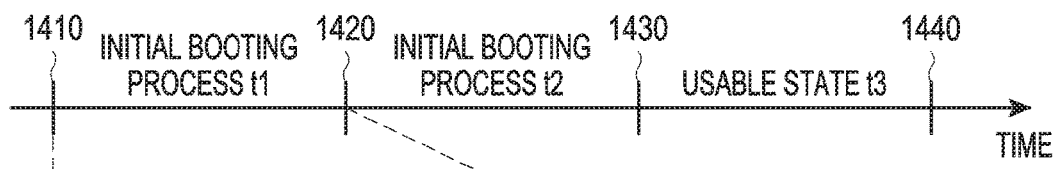
FIG. 14A is a time graph illustrating the booting time of an electronic device including a plurality of communication circuits according to various embodiments of the disclosure.
Figure 14B:
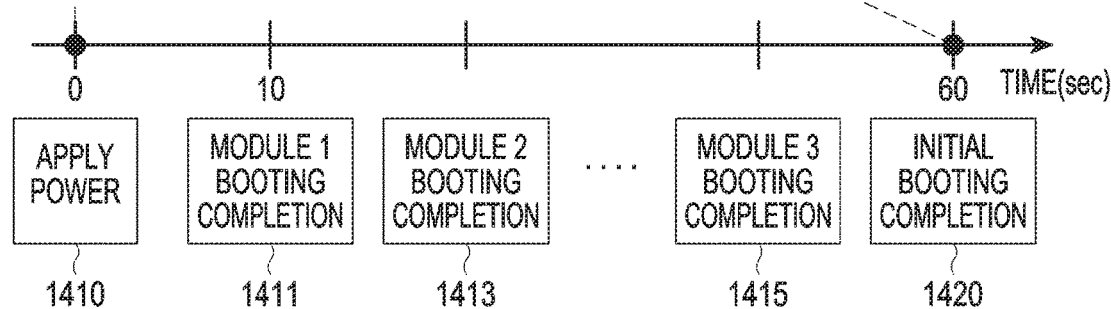
FIG. 14B is a time graph illustrating the booting time of an electronic device including a plurality of communication circuits according to various embodiments of the disclosure.

FIGS. 14A and 14B are time graphs illustrating the booting time of the electronic device 101 including a plurality of communication circuits according to various embodiments of the disclosure. Power may be applied to the electronic device and the booting of the electronic device 101 may be started. The booting of each of a plurality of modules included in the electronic device 101 may be completed in the designated order so that the entire booting may be completed. According to various embodiments of the disclosure, the plurality of modules may include a first module and a second module that can control a communication circuit. For example, while the first electronic device is booted, the booting of the first module of the electronic device may be first completed and the second module thereof may be booted. For example, the first module (e.g., a Wi-Fi driver) of the electronic device may transmit first information through the communication module (e.g., a Wi-Fi communication module), and the second module (e.g., an application or a processor) may transmit second information through the communication module. That is, the first information may be based on the same Wi-Fi communication, but an entity that transmits the first information may be a Wi-Fi driver. The second information may be based on Wi-Fi communication, but may be an application or a processor for controlling the Wi-Fi module, unlike the entity that transmits the first information. The booting in FIG. 14 may be the initial booting or the rebooting. FIG. 14A illustrates an example of the initial booting requiring the initial installation. In FIG. 14A, at the time 1410, power may be applied and the initial booting may be started. When the booting of all the modules included in the electronic device 101 is completed through an initial booting process t1, at the time 1420 where the initial booting is completed, the initial installation may be started. An installation process such as inputting account information about the electronic device 101 may be completed through an initial installation process t2. After the time 1430 in which the initial installation process is completed, the electronic device 101 may be in a usable state t3 on the basis of the registered account information. For example, at the time 1440 during the process t3, data for controlling the electronic device 101 may be received or a signal generated by the electronic device 101 may be transmitted to another electronic device or a server.

The initial booting process of the electronic device 101 is further detailed as shown in FIG. 14B. FIG. 14B shows the initial booting process of a power supply device along the time axis in units of sec (seconds). When the time 1410 at which power is applied is set to time 0 and the modules included in the electronic device are module 1, module 2, and module 3, the booting of the module 1 may be completed, the booting of the module 2 may be completed, and the booting of the module 3 may be completed in the designated order, so that the initial booting may be completed at the time 1420. For example, the time at which the module 1 is booted may be 10 seconds, and the time at which the initial booting is completed may be 60 seconds. For example, module 1 may be a BLE communication circuit and module 3 may be a Wi-Fi communication circuit. The booting of the BLE communication circuit may be completed ahead of the Wi-Fi communication circuit as shown in FIG. 14B, and the booting thereof may be completed at a relatively earlier time in the entire booting time. The user may receive information about the booting state of the electronic device 101 as an advertising signal acting as the first information at the time at which the booting of the BLE communication circuit is completed. Further, the user may receive the information about the booting state of the electronic device 101 as a Wi-Fi data signal acting as the second information at the time at which the initial booting is completed. The user can have the effect of reducing the blackout time for the electronic device by receiving information about a state in which the electronic device is being currently booted during the initial booting compared to receiving the booting information of the electronic device at the time at which the initial booing is completed.

Figures 15A, 15B, 15C:
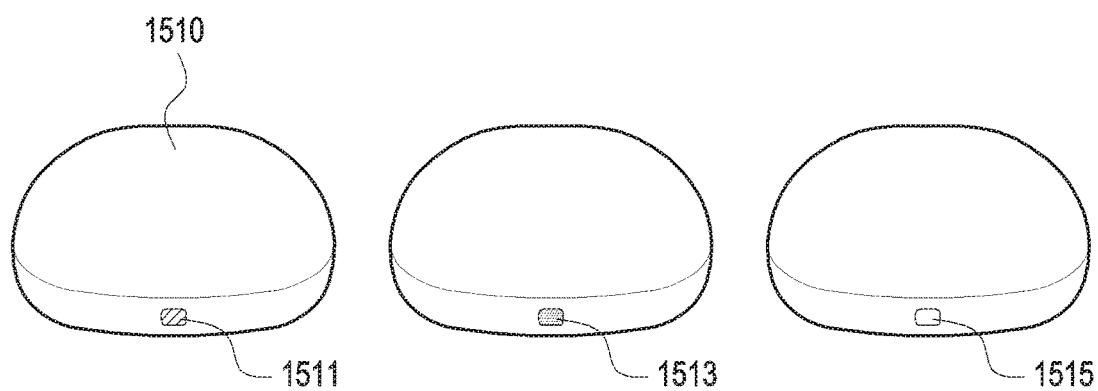
FIG. 15A is a conceptual diagram illustrating a method of displaying booting information in an electronic device including a plurality of communication circuits according to various embodiments of the disclosure.
FIG. 15B is a conceptual diagram illustrating a method of displaying booting information in an electronic device including a plurality of communication circuits according to various embodiments of the disclosure.
FIG. 15C is a conceptual diagram illustrating a method of displaying booting information in an electronic device including a plurality of communication circuits according to various embodiments of the disclosure.

FIGS. 15A, 15B, and 15C are conceptual diagrams illustrating a method of displaying booting information in an electronic device 1510 including a plurality of communication circuits according to various embodiments of the disclosure. The electronic device 1510 may be a router, and the router may have an LED lamp 1511 on the front. The router may use an LED lamp to indicate a communication state. For example, if Wi-Fi communication is normally connected, a green LED may be turned on/off at designated time intervals. Alternatively, if Wi-Fi communication is not connected, the LED lamp may blink. In the case of FIG. 15A, an indication 1511 may represent a state in which the green light of the LED lamp is turned on while the power of the router is turned on. In the case of FIG. 15B, an indication 1513 may represent a state in which the Wi-Fi communication is connected to the router and the green light of the LED lamp is turned on/off at designated time intervals when the speed of the Wi-Fi communication is equal to and higher than a designated speed. In the case of FIG. 15C, an indication 1515 may represent a state in which power is not connected to the router or the Wi-Fi communication is not connected so that the LED lamp is turned off. The user may be only provided with information such as whether the operation of the router is normally performed, whether the connection of the Wi-Fi communication is smoothly performed, and the like through one LED lamp, so that the kind of information that the user can perceive is limited. For example, if the router is initially installed, power may be applied, the booting of the router may be normally completed according to the initial booting, and then the initial installation may be performed through an application such as a computer, a tablet, or a smartphone connected to the router. The user can only know limited information displayed through the operation of the LED lamp included in the router until information such as booting completion information of the router, installation progress information thereof, and the like is provided through the application of the smartphone at the time at which the booting of the router is completed.

Figure 16A:
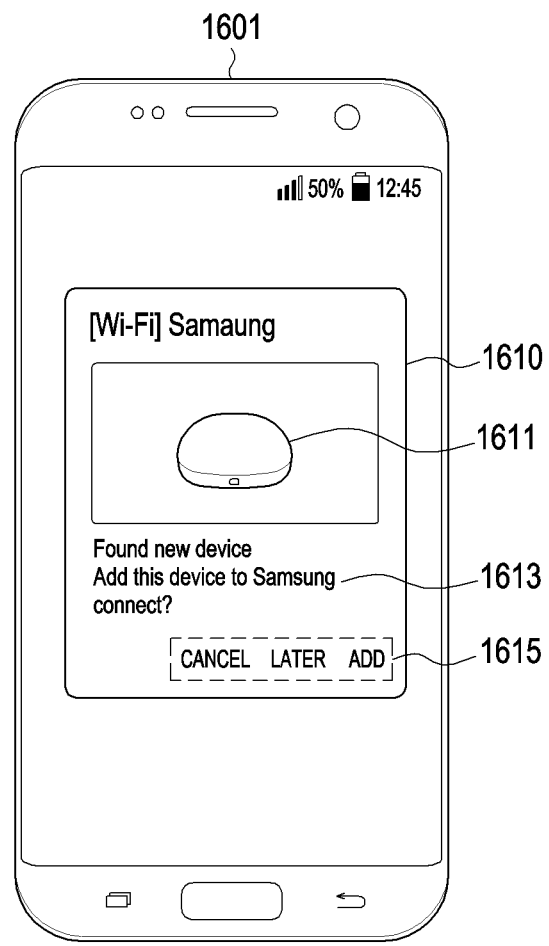
FIG. 16A is a conceptual diagram illustrating a method of displaying booting information of a first electronic device in an electronic device including a plurality of communication circuits according to various embodiments of the disclosure.
Figure 16B:
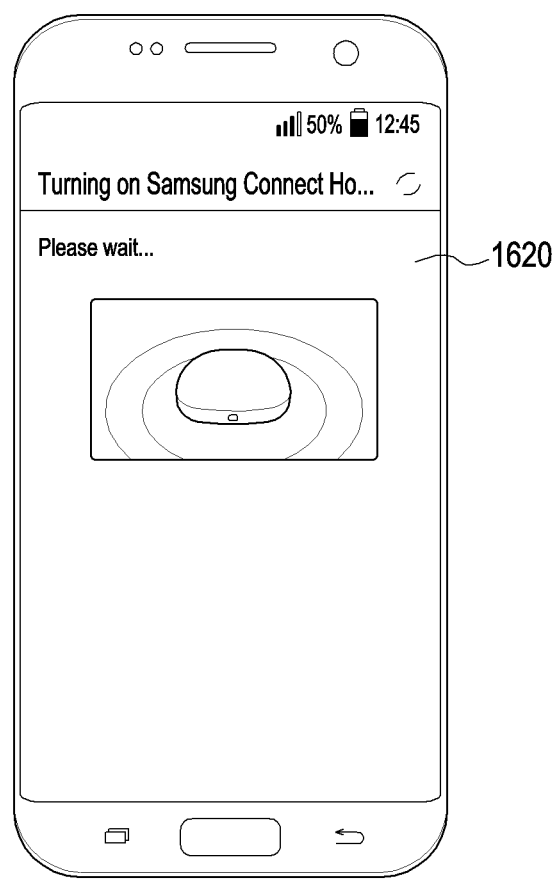
FIG. 16B is a conceptual diagram illustrating a method of displaying booting information of a first electronic device in an electronic device including a plurality of communication circuits according to various embodiments of the disclosure.

FIGS. 16A and 16B are conceptual diagrams illustrating a method of displaying booting information of a first electronic device 102 in an electronic device 1601 (E.G., 101) including a plurality of communication circuits according to various embodiments of the disclosure. In various embodiments, as shown in FIG. 16A, the electronic device 1601 may be implemented as a smartphone in which an application for controlling the first electronic device 102 is installed. The smartphone may add other electronic devices to be accessed or controlled via the electronic device 1601. For example, a router (for example, a Wi-Fi router) may be added to control a plurality of sensors connected to the router. The first electronic device 1601, that is, the router may transmit first information according to the structure of an advertising packet during the initial booting of the router using a first communication circuit included in the router, for example, a BLE communication circuit. The electronic device 1601 may output information about the initial booting state of the router as shown in FIG. 16A on the basis of the received first information. A screen 1610 may include an icon 1611 indicating the router, information 1613 through which the router is retrieved, CANCEL, LATER and ADD button icons 1615 for connecting to the retrieved router. Referring to FIG. 16B, the electronic device 1601 may perform an operation of connecting the retrieved router and may output, to the user, guidance text such as "the retrieved router is currently connecting so please wait for a while" as shown in a screen 1620.

FIGS. 17A and 17B are conceptual diagrams illustrating a method of displaying installation information of a first electronic device 102 in an electronic device 101 including a plurality of communication circuits according to various embodiments of the disclosure. The electronic device 101 may be a smartphone equipped with an application for accessing and controlling the first electronic device 102 as shown in FIG. 17A. The electronic device 101 may receive second information indicating a state in which the initial booting of the first electronic device 102 is completed, from the first electronic device 102, and may output screens such as FIGS. 17A and 17B on the basis of the second information. Specifically, the electronic device 101 may perform an initial installation process for the first electronic device 102, for example, the router whose initial booting has been completed, as shown in a screen 1710. A state of being currently connected to the router may be displayed as a text message 1711 and a currently connected state 1713 for providing a specific service via the smartphone may be displayed. An icon 1715 for the currently connected router (e.g., a Wi-Fi router), that is, the first electronic device and the electronic device 101 may be displayed, and a progress bar 1717 for the initial installation progress may be provided.

FIG. 17B illustrates an interface screen 1720 for receiving account information for initial installation in the electronic device 101 and may acquire, at 1729, a Wi-Fi account and password information 1725 by a user input. It is possible to display the fact that the Wi-Fi communication is being currently set as text 1723 and to display information 1727 about the next process after the account information is input.

According to various embodiments of the disclosure, in a computer-readable recording medium that stores instructions configured to perform at least one operation by a processor, the at least one operation may include an operation of receiving first information about the state of a first electronic device after the booting of the first electronic device is initiated and before the booting of the first electronic device is completed; and an operation of controlling an output device to output state information of the first electronic device on the basis of the first information.

The embodiments disclosed herein are provided merely to explain the technical details of the disclosure and to help the understanding of the disclosure, and are not intended to limit the scope of the disclosure. Therefore, it should be construed that all modifications and changes or various other variants based on the technical idea of the disclosure fall within the scope of the disclosure.

The invention claimed is:

1. An electronic device comprising:
a display;
a first wireless communication circuit;
at least one processor electrically connected to the first wireless communication circuit; and
a memory electrically connected to the at least one processor and configured to store instructions,
wherein the instructions, when executed, cause the at least one processor to:
receive, from a first electronic device, first information indicating a state of the first electronic device through the first wireless communication circuit after a booting of the first electronic device is initiated and before the booting of the first electronic device is completed,
based on the first information, control the display to display a screen for receiving a user input to connect the electronic device and the first electronic device,
based on the receiving of the user input to connect the electronic device and the first electronic device, control the display to display booting state information of the first electronic device, and
control the display to display a state in which the electronic device is being currently connected to the first electronic device after the booting of the first electronic device is completed.

2. The electronic device of claim 1, wherein the first information includes at least one of a state in which the first electronic device is being currently booted, or a state in which a second wireless communication circuit included in the first electronic device is being currently booted.

3. The electronic device of claim 2, wherein the second wireless communication circuit of the first electronic device is a Bluetooth low energy (BLE) communication circuit.

4. The electronic device of claim 3, wherein the first information is included in an advertising packet according to BLE communication of the first electronic device, and the first information is configured to be transmitted in response to loading of a BLE communication driver during a booting process of the first electronic device.

5. The electronic device of claim 1, wherein the first wireless communication circuit includes a BLE communication circuit and a Wi-Fi communication circuit, and the first information is received through the BLE communication circuit.

6. The electronic device of claim 1, wherein the booting state information of the first electronic device includes at least one of information about a normal booting state designated for the first electronic device, information about an abnormal booting state, information about a booting process, or additional information required for the booting.

* * * * *